US011573578B2

(12) United States Patent
Zilberstein et al.

(10) Patent No.: US 11,573,578 B2
(45) Date of Patent: Feb. 7, 2023

(54) SYSTEM AND METHOD FOR PAYLOAD DISPERSION USING UAVS

(71) Applicant: ALMOG RESCUE SYSTEMS LTD., Haifa (IL)

(72) Inventors: Ariel Zilberstein, Giv'at Ada (IL); Udi Graff, Haifa (IL)

(73) Assignee: ALMOG RESCUE SYSTEMS LTD., Haifa (IL)

( * ) Notice: Subject to any disclaimer, the term of this patent is extended or adjusted under 35 U.S.C. 154(b) by 704 days.

(21) Appl. No.: 16/558,812

(22) Filed: Sep. 3, 2019

(65) Prior Publication Data

US 2020/0019190 A1 Jan. 16, 2020

Related U.S. Application Data

(63) Continuation of application No. 15/778,480, filed as application No. PCT/IL2016/051262 on Nov. 23, 2016, now Pat. No. 10,401,873.

(30) Foreign Application Priority Data

Nov. 23, 2015 (IL) ........................................ 242716
Dec. 17, 2015 (IL) ........................................ 243182
Apr. 12, 2016 (IL) ........................................ 245071

(51) Int. Cl.
*G05D 1/10* (2006.01)
*B64C 39/02* (2006.01)
(Continued)

(52) U.S. Cl.
CPC ........... *G05D 1/104* (2013.01); *A62C 3/0242* (2013.01); *B64C 39/024* (2013.01); *B64D 1/16* (2013.01);
(Continued)

(58) Field of Classification Search
CPC .... G05D 1/104; G05D 1/0094; A62C 3/0242; A62C 3/0271; A62C 99/009;
(Continued)

(56) References Cited

U.S. PATENT DOCUMENTS 3,473,761 A 10/1969 Chutter
6,364,026 B1 * 4/2002 Doshay ................ G08B 17/005
169/56
(Continued)

FOREIGN PATENT DOCUMENTS

CN 202508280 U 10/2012
DE 4032672 A1 4/1992
(Continued)

OTHER PUBLICATIONS

Hansen, Rickard. "Corrigendum to: Estimating the amount of water required to extinguish wildfires under different conditions and in various fuel types." International journal of wildland fire 21.6 (2012): 778-778. (Year: 2012).*
(Continued)

*Primary Examiner* — Elaine Gort
*Assistant Examiner* — Ellis B. Ramirez
(74) *Attorney, Agent, or Firm* — Dorsey & Whitney LLP

(57) ABSTRACT

According to some examples of the presently disclosed subject matter there is provided a system and method for deploying a plurality of unmanned aerial vehicles (UAVs) by an airborne carrier aircraft for dispersing payload material, each UAV comprising at least one container containing payload material and being configured to disperse the payload material at a designated dispersion area in an event site.

17 Claims, 12 Drawing Sheets

(51) Int. Cl.

| | |
|---|---|
| ***A62C 3/02*** | (2006.01) |
| ***B64D 5/00*** | (2006.01) |
| ***B64D 11/00*** | (2006.01) |
| ***G05D 1/00*** | (2006.01) |
| ***B64D 1/16*** | (2006.01) |

(52) U.S. Cl.
CPC ............ *B64D 5/00* (2013.01); *B64D 11/0015* (2013.01); *G05D 1/0094* (2013.01); *B64C 2201/128* (2013.01); *B64C 2201/143* (2013.01); *B64C 2201/206* (2013.01)

(58) Field of Classification Search
CPC . A62C 3/025; B64C 39/024; B64C 2201/128; B64C 2201/143; B64C 2201/206; B64C 2201/082; B64C 2201/145; B64D 1/16; B64D 5/00; B64D 11/0015; H04W 74/08; B67D 7/02; G08G 5/0013
USPC ...................................... 701/300, 3, 50, 101
See application file for complete search history.

(56) References Cited

U.S. PATENT DOCUMENTS

| | | | | |
|---|---|---|---|---|
| 7,975,774 | B2 | 7/2011 | Akcasu et al. | |
| 8,237,096 | B1 | 8/2012 | Alexander et al. | |
| 8,948,935 | B1 | 2/2015 | Patrick et al. | |
| 9,567,081 | B1 | 2/2017 | Beckman et al. | |
| 9,828,097 | B1 * | 11/2017 | Mishra ............... | H04B 7/18506 |
| 2004/0216932 | A1 * | 11/2004 | Giovanetti ........... | B62D 55/065 180/9.1 |
| 2005/0006525 | A1 | 1/2005 | Byers et al. | |
| 2006/0108477 | A1 | 5/2006 | Helou et al. | |
| 2007/0018033 | A1 | 1/2007 | Fanucci et al. | |
| 2009/0120653 | A1 * | 5/2009 | Thomas ................... | A62C 5/02 169/61 |
| 2009/0205845 | A1 * | 8/2009 | Hoffman ................ | A62C 3/025 701/2 |
| 2012/0138727 | A1 | 6/2012 | Fisher | |
| 2012/0261144 | A1 * | 10/2012 | Vian .................... | G08B 17/125 169/43 |
| 2014/0027131 | A1 * | 1/2014 | Kawiecki ............. | A62C 3/0242 169/53 |
| 2015/0226575 | A1 * | 8/2015 | Rambo ................ | G08G 5/0034 701/523 |
| 2015/0336668 | A1 | 11/2015 | Pasko et al. | |
| 2016/0205918 | A1 | 7/2016 | Chan et al. | |

FOREIGN PATENT DOCUMENTS

| | | | |
|---|---|---|---|
| DE | 102004034684 | A1 | 2/2006 |
| KR | 101188294 | B1 | 10/2012 |
| WO | 2011137335 | A1 | 11/2011 |
| WO | 2013055265 | A1 | 4/2013 |
| WO | 2015051436 | A1 | 4/2015 |
| WO | 2016024276 | A1 | 2/2016 |

OTHER PUBLICATIONS

International Search Report and Written Opinion for International Application No. PCT/IL2016/051262 dated Mar. 5, 2017.
"CH Robotics WIns Air Force Contract to Develop Drone Gliders", https://www.chrobotics.com/drone-gliders last accessed Oct. 22, 2014, Oct. 18, 2012, 1 page.
"Chinese CM-506KG Small Diameter Precision Guided Glide Bomb", http://zpcr.blogspot.co.il/2012/11/Chinese-cm/506kg-small-diamter.html last accessed Oct. 22, 2014, Nov. 15, 2012, 1 page.
"Precision Offset High Glide Aerial Delivery of Munitions, Equipment and Personnel", Remote Aerial Delivery System, http://www.natick.army.mil/about/pao/pubs/warrior/98/feb/rads/htm last accessed Oct. 22, 2014, 2 pages.
"Projects: Glider Assisted Torpedo, NSTL Visakhapatnam", http://www.iitk.ac.in/aero/akg/index.php?page=torpedo last accessed Oct. 22, 2014, 1 page.
"sikorsky (/database/manufacturere/4/) s-64 CH-54", http://www.helis.com/database/model/61/last accessed Jun. 27, 2016, 2 pages.
"ULAV—Unmanned logistics air vehicles", Precision Aerial Delivery Systems, http://defense-update.com/features/du-1-07/aerialdelivery6-ulav.htm last accessed Oct. 22, 2014, Jan. 2007, 1 page.
Mahmoud, et al., "Toward a Cloud Platform for UAV Resources and Services", IEEE Computer Society, 4th Symposium on Network Cloud Computing and Applications, 2015, pp. 23-30.
Yahyanejad, et al., "A fast and mobile system for registration of low-altitude visual and thermal aerial images using multiple small-scale UAVs", Preprint submitted to ISPRS, Jun. 23, 2014, pp. 1-34.
Yuan, et al., "A survey on technologies for automatic forest fire monitoring, detection, and fighting using unmanned aerial vehicles and remote sensing techniques", Can. J. For, Res. 45, published at www.nrcresearchpress.com/cjfr on Mar. 12, 2015, pp. 783-792.

* cited by examiner

SYSTEM AND METHOD FOR PAYLOAD DISPERSION USING UAVS

FIELD OF THE PRESENTLY DISCLOSED SUBJECT MATTER

The presently disclosed subject matter is related to the operation and control of unmanned aerial vehicles used for payload dispersion.

BACKGROUND

It is well known to use unmanned aerial vehicles (UAVs) in order to deliver payload to a predetermined area, and then either place the payload within that area or to disperse it therein. UAVs are useful in applications where the payload must be delivered to an area which is inaccessible or hazardous to human beings. Such UAVs are used for a variety of applications, such as dispersion of fire extinguishing material over a fire site, delivery of supplies (medical, food and otherwise) to inaccessible areas, cloud seeding applications, etc.

GENERAL DESCRIPTION

Different operational events require delivery of a payload to specific areas within an event site. The term “operational event” (or “event” in short) as used herein includes any type of event which may require the dispersion of a payload over a designated area, including emergency events and routine events.

Emergency events are events which are hazardous to humans or to the environment and require quick response in order to contain the event and minimize any possible damage to human lives, property or the environment. Emergency events include for example, wildfires, oil spills, biological hazard spill, chemical hazard spill, etc. Routine events are in general premeditated events executed as part of an ordinary routine work. Routine events include for example, cloud seeding, dispersion of pesticides, humanitarian aid etc.

Each type of operational event requires the delivery of one or more respective types of payload material to designated areas in the event site. In some cases large amounts of payload is required to be delivered to the event site in a short time. For example, in a wildfire event a fire extinguishing material needs to be delivered to the fire site in a short time in order to reduce the temperature of the fire to a desired temperature which enables to control and contain the fire from spreading; in an oil spill event, oil absorbing and/or oil disintegrating material needs to be delivered to the oil spill site; and in a cloud seeding event, chemicals or electric loaded water needs to be delivered in order to increase the amount of precipitation which falls from the sky.

According to one aspect of the presently disclosed subject matter there is provided a system for deploying a plurality of unmanned aerial vehicles (UAVs) by an airborne carrier aircraft for dispersing payload material, each UAV comprising at least one container containing payload material and being configured to disperse the payload material at a designated dispersion area in an event site, the system comprising:

a computerized command and control unit mountable on-board the airborne carrier aircraft and operatively connected to a data acquisition device;

the command and control unit is configured to:

operate the data acquisition device for obtaining situation awareness data from the event site; transmit the situation awareness data to a user device and receive user data input from the user device; the input data including information of a selected payload dispersion area; the dispersion area comprising one or more dispersion area segments;

process the situation awareness data and/or the user data input to: determine a required payload capacity for each segment;

assign one or more UAVs from the plurality of UAVs to each segment, based on the required payload capacity;

generate for each UAV a respective flight plan including a flight path for directing the UAV from an expected dropping point location to a dispersion point.

In addition to the above features, the system according to this aspect of the presently disclosed subject matter can optionally comprise one or more of the features listed below, in any technically possible combination or permutation:

wherein the system further comprises the UAV cloud, where each UAV is configured, upon dropping thereof from the carrier aircraft when airborne, to: autonomously operate a flight control unit for directing flight according to a respective flight path to a respective dispersion point and operate a payload dispersion unit for dispersion the payload at the dispersion point.

Wherein the command and control unit is configured to transmit and receive data over a cellular communication network.

Wherein the system further comprises a communication unit being operatively connected to the command and control unit is and configured to transmit and receive data over a communication network.

Wherein the command and control unit is configured, following dropping of the UAV cloud from the carrier aircraft, to update respective flight paths according to an actual dropping location and transmit flight path updates to the UAV cloud.

Wherein the command and control is configured, following dropping of a the UAV cloud from the carrier aircraft to monitor flight progress of at least one UAV in the UAV cloud and transmit to the at least one UAV flight instructions for operating a flight control unit on-board the UAV for directing the UAV to proceed to a respective dispersion point, in case a deviation from the respective flight plan is detected.

Wherein the command and control unit is configured, for assigning one or more UAVs from the UAV cloud to each segment, to:

estimate, based on the situation awareness data and/or the user data input, a total amount of payload required in each given segment; and determine a number of UAVs assigned to a given segment, based on an amount of payload carried by each UAV.

Wherein the event is a wildfire, the data acquisition device is a short wave infra-red camera (SWIR) and the payload material is fire extinguishing material.

Wherein the command and control unit is configured, for assigning one or more UAVs from the UAV cloud to each segment, to:

determine, based on the situation awareness data and/or the user data input, a current fire intensity at each given segment; estimate a total amount of payload required for reducing the current fire intensity at each given segment to a desired intensity; and determine a number of UAVs assigned to each given segment, based on an amount of payload carried by each UAV.

Wherein the user data input further includes one or more of: wind direction, dispersion direction, and no-flight zones.

Wherein the user data input further includes: fire type, fire load type, wind direction, dispersion direction, and no-flight zones.

Wherein the flight plan further comprises information pertaining to: UAV rotating rate during dispersion, required payload dispersion height, and UAV angle of attack during dispersion.

Wherein the command and control unit is configured, for coordinating the time of payload dispersion of different UAVs assigned to the same segment; to:

provide in each respective flight plan, assigned to the different UAVs, a different flight path characterized by a different route and/or different range from the drop point to the dispersion location.

wherein the command and control unit is configured for coordinating the time of payload dispersion of a first UAV and a second UAV from among the UAVs assigned to a given segment to:

determine a respective dispersion time for each one of the first UAV and second UAV;

determine a respective flight path for each one of the first UAV and second UAV, each respective flight path is characterized by a range selected to bring the respective UAV to a respective dispersion point at the respective time.

wherein the UAVs are engineless UAVs with limited control on velocity.

wherein the dispersion point of the first UAV is different than the dispersion point of the second UAV and the dispersion time of the first UAV is the substantially the same as the dispersion time of the second UAV, and wherein the respective flight path of the first UAV and the respective flight path of the second UAV are determined such that the first UAV and second UAV reach their respective dispersion points substantially at the same time, thereby enabling dispersion of payload material at different dispersion points substantially at the same time.

wherein the dispersion point of the first UAV is substantially the same as the dispersion point of the second UAV and the dispersion time of the first UAV is different than the dispersion time of the second UAV, and wherein the respective flight path of the first UAV and the respective flight path of the second UAV are determined such that the first UAV and second UAV reach their respective dispersion point ad different times, thereby enabling dispersion of payload material at the same dispersion point by different UAVs.

Wherein the system is operatively connected to a ground command and control unit connected to a plurality of UAVs stored in a storage and maintenance facility and is configured to routinely activate a maintenance check for determining operability of the plurality of UAVs.

Wherein the command and control unit is further configured to activate a payload filling system for executing a filling procedure for filling a container in each UAV with payload material prior to loading the UAVs on the carrier aircraft.

Wherein the event is any one of: oil spill, cloud seeding, biological hazard spill, chemical hazard spill, wildfire, pesticides.

Wherein the UAV is an engineless glider.

Wherein the UAV is made of consumable and/or bio degradable material.

Wherein one or more of the plurality of UAVs comprise at least one sensor device configured to detect situation awareness data from the event site surroundings; and wherein the command and control unit is further configured to receive from one or more UAVs data sensed by one or more sensors on-board the UAVs and to provide respective output including real-time SAD and/or performance feedback.

Wherein the command and control unit is further configured to:

receive from at least one UAV a first data detected by a first respective sensor onboard the at least one UAV, wherein the first data is detected during a first time period; receive from at least one other UAV a second data detected by a second sensor onboard the at least one other UAV, wherein the second data is detected during a second time period;

determine whether a change exists between the first data and the second data; wherein the first time period is later than the second time period and wherein payload material is dispersed over the event site by one or more of the plurality of UAVs during a time between the first time period and the second time period; generate output data including performance feedback indicative of the effect of the dispersed payload on the event site, the performance feedback is related to the determined change.

Wherein the command and control unit is further configured to:

Wherein the command and control unit is further configured to:

receive from one or a plurality of UAVs sensed data collected at the event site; determine based on the sensed data estimated future event conditions.

According to another aspect of the presently disclosed subject matter there is provided a payload dispersion system comprising:

a plurality of UAVs each comprising at least one container containing payload material configured to disperse the payload material at a designated dispersion area in an event site and being mountable on an carrier aircraft;

a computerized command and control unit mountable on-board the carrier aircraft and operatively connected to a data acquisition device;

the command and control unit configured to:

operate the data acquisition device for obtaining situation awareness data from the event site; transmit the situation awareness data to a user device and receive user data input from the user device; the input data including information of a selected payload dispersion area;

process the situation awareness data and the user input data to generate for each UAV a respective flight plan for directing the UAV from an estimated dropping point location to a dispersion point;

each UAV is configured, upon dropping thereof from the carrier aircraft when airborne, to: autonomously operate a flight control unit for directing flight according to a respective flight path to a respective dispersion point and operate a payload dispersion unit for dispersion the payload at the dispersion point.

Wherein the command and control unit of the payload dispersion system is further configured to process the situation awareness data and the user input data for determining segmentation of the payload dispersion area into one or more segments and a required payload capacity for each segment; and assign one or more of the UAVs to each segment, based on the required payload capacity.

According to another aspect of the presently disclosed subject matter there is provided a payload dispersion method for use with a carrier aircraft, the method comprising:

mounting on the carrier aircraft a plurality of UAVs each comprising at least one container containing payload material and configured to disperse the payload material; each UAV comprising a flight control unit and a payload dispersion unit and being configured to autonomously operate the flight control unit for directing flight according to a respective flight path;

providing a computerized command and control unit mounted on-board the carrier aircraft and operatively connected to a data acquisition device;

operating the command and control unit to:

operate the data acquisition device for obtaining situation awareness data from the event site, transmit the situation awareness data to a user device and receive user data input from the user device, the input data including information of a selected payload dispersion area;

process the situation awareness data and the user input data to generate for each UAV the respective flight plan for directing the UAV from an estimated dropping point location to a dispersion point;

dropping the UAVs from the carrier aircraft when airborne, to allow each UAV to autonomously operate the flight control unit for directing flight according to the respective flight path to the respective dispersion point and operate the payload dispersion unit for dispersion of the payload at the dispersion point.

Wherein one or more of the plurality of UAVs comprise at least one sensor device configured to detect situation awareness data from the event site surroundings; and wherein the method further comprises:

receiving from one or more UAVs data sensed by one or more sensors on-board the UAVs and providing respective output including real-time SAD and/or performance feedback.

Wherein the method further comprises:

receiving from at least one UAV a first data detected by a first respective sensor onboard the at least one UAV, wherein the first data is detected during a first time period; receiving from at least one other UAV a second data detected by a second sensor onboard the at least one other UAV, wherein the second data is detected during a second time period;

determining whether a change exists between the first data and the second data; wherein the first time period is later than the second time period and wherein payload material is dispersed over the event site by one or more of the plurality of UAVs during a time between the first time period and the second time period; transmitting to a user device output data including performance feedback indicative of the effect of the dispersed payload on the event site, the performance feedback is related to the determined change.

Wherein the method further comprises:

receiving from one or a plurality of UAVs sensed data collected at the event site;

determining based on the sensed data estimated future event conditions.

According to another aspect of the presently disclosed subject matter there is provided a non-transitory program storage device readable by a machine, tangibly embodying a program of instructions executable by the machine to perform method steps of a payload dispersion method for use with a plurality of UAVs each comprising at least one container containing payload material and is configured to disperse the payload material at a designated dispersion area in an event site and being mountable on an carrier aircraft;

the method comprising:

each UAV comprising a flight control unit and a payload dispersion unit and being configured to autonomously operate the flight control unit for directing flight according to a respective flight path;

operating the command and control unit to:

obtain situation awareness data of the event site from a data acquisition device; transmit the situation awareness data to a user device and receive user data input from the user device, the input data including information of a selected payload dispersion area;

process the situation awareness data and the user input data to generate for each UAV the respective flight plan for directing the UAV from an estimated dropping point location to a dispersion point.

According to another aspect of the presently disclosed subject matter there is provided a payload dispersion method for use with a carrier aircraft, the method comprising:

mounting on the carrier aircraft a plurality of UAVs each comprising at least one container containing payload material and configured to disperse the payload material; each UAV comprising a flight control unit and a payload dispersion unit and being configured to autonomously operate the flight control unit for directing flight according to a respective flight path;

providing a data acquisition device operatively connected to a computerized command and control unit mounted on-board the carrier aircraft;

operating the command and control unit to:

operate the data acquisition device for obtaining situation awareness data from the event site, transmit the situation awareness data to a user device and receive user data input from the user device, the input data including information of a selected payload dispersion area;

process the situation awareness data and the user input data to generate for each UAV the respective flight plan for directing the UAV from an estimated dropping point location to a dispersion point;

dropping the UAVs from the carrier aircraft when airborne, to allow each UAV to autonomously operate the flight control unit for directing flight according to the respective flight path to the respective dispersion point and operate the payload dispersion unit for dispersion the payload at the dispersion point.

The systems, methods and the program storage device disclosed in accordance with the presently disclosed subject matter can optionally comprise one or more of features listed above, mutatis mutandis, in any technically possible combination or permutation.

According to yet another aspect of the subject matter of the present application, there is provided a payload filling system for one or more UAV units, each UAV unit comprising one or more dispersion containers configured for receiving, through one or more inlet ports thereof, and containing therein, a certain amount of said payload, said system comprising:

one or more sources of said payload;

a filling infrastructure configured for providing said payload from the one or more sources into said one or more inlet ports;

a command and control unit associated with filling infrastructure and with said UAV units, and effective for controlling at least one of the following:

regulating filling of the payload into the one or more UAV units and receiving therefrom data regarding the filling of payload; and monitoring airworthiness capability of the UAV units in idle state.

The command and control unit can also be configured for:

receiving operational data from similar command and control units associated with another plurality of UAV units; and performing software and firmware updates of the UAV units associated therewith.

In addition to the above features, the filling system according to this aspect of the presently disclosed subject matter can optionally comprise one or more of the features listed below, in any desired combination or permutation:

each of the one or more sources comprises one or more source containers configured for containing therein the required payload.

the one or more sources can comprise different types of payload.

the inlet port may constitute an aerial valve of the UAV. Said filling infrastructure can comprise one or more filling valves configured for selectively engaging said aerial valve for transferring the payload from the one or more sourced into the UAV.

according to another example, the filling infrastructure can comprise two or more ground filling valves, each being configured for engagement with the aerial valve of an individual UAV of the one or more UAV units.

the command and control unit is effective for regulating any one or more of the following:

the amount of payload provided from each source towards each one of said one or more ground filling valves;

the rate of filling of payload; and the pressure of filling of payload.

the command and control unit is configured for determining any one or more of the following:

the amount of payload to be filled into the UAV units;

the types of payload to be filled into the UAV units;

the rate of filling of the payload into the UAV units;

the number of UAV units to be filled with payload and the amount of payload for each such UAV unit; and the filling pressure of the UAV units.

the pressure at which the filling rate is in the range of 150 to 450 liters per second.

a UAV unit can be filled with more than one type of payload.

the payload filling system can be incorporated in a ground storage having a storage area configured for housing said one or more UAV units, said filling infrastructure having a filling outlet at the storage area.

the UAV units are configured, when housed in the storage area, to be permanently connected to the filling infrastructure.

the command and control unit is remote controlled by an end user via an app.

According to still another aspect of the subject matter of the present application, there is provided a method for filling one or more UAV units using the payload filling system of the previous aspect of the present application, said method comprising the steps of:

a) receiving, by the command and control unit, any one or more of the following filling parameters:

amount of payload to be filled into the UAV units;

the types of payload to be filled into the UAV units;

the rate of filling of the payload into the UAV units; and the number of UAV units to be filled with payload and the amount of payload for each such UAV unit.

b) selectively engaging the required number of UAV units to the filling infrastructure based on said filling parameters; and c) regulating, using said command and control unit, the selective filling of payload into the UAV units based on said filling parameters.

In addition to the above features, the filling method according to this aspect of the presently disclosed subject matter can optionally comprise one or more of the features listed below, in any desired combination or permutation:

prior to step (a), the command and control unit determines one or more of the filling parameters based on data collected from the area in which said payload is to be dispersed by the one or more UAV units.

inlet ports of the one or more UAV units may constitute aerial valves thereof and said filling infrastructure comprises one or more filling valves, and wherein during step (b) the filling includes coupling of the one or more filling valves to the respective aerial valves of the one or more UAV units.

the filling infrastructure can comprise a pressure controller configured for regulating the pressure of the payload within the UAV unit being filled. Specifically, the pressure controller can comprise a sensor configured for measuring the pressure within the UAV unit being filled or receiving such pressure measurements from a sensor on the UAV itself.

one or more UAV units can be configured for being housed in the storage area remote from the filling infrastructure, wherein the method further includes a step (a') of displacing the UAV units within the storage area to a location closer to the filling infrastructure, allowing the selective engagement of step (b).

the method can also include an air worthiness checkup step (0) including a periodic checkup and maintenance of empty UAV units housed in the storage area during an idle state thereof. Specifically, the command and control unit can be configured for determining the time intervals between such checkups.

the command and control unit is configured for performing the following preliminary steps before step (a):

i. receiving an indication of an event;

ii. determining, based on the event, the required filling parameters; and iii. providing the filling parameters to the filling infrastructure, thereby initiating step (a).

1. According to yet a further aspect of the subject matter of the present application, there is provided a method for producing a carrier for carrying one or more UAV units and dropping them when the carrier is airborne, said method comprising:

a) providing a carrier having a given designation other than carrying said one or more UAV units;

b) providing the carrier with a dropping arrangement configured for selective dropping of the UAV units from the carrier;

c) providing the carrier with an on-board command and control unit according to the first aspect of the subject matter of the present application.

In addition to the above features, the conversion method according to this aspect of the presently disclosed subject matter can optionally comprise one or more of the features listed below, in any desired combination or permutation:

the method can also include the following preliminary step:

i. identifying at least one available carrier in the vicinity of a storage area in which one or more UAV units are housed; and ii. utilizing said carrier for step (a) to (c) of the method.

the command and control unit can be configured to identify the availability of the carrier based on a required amount of filled UAV units to be carried.

step (c) of the method is constituted by the following sub-steps:

C1) removing a functional component of the carrier;

C2) assembling to the carrier a replacement component comprising the on-board command and control unit.

In particular, assembling said replacement component is performed as a form-fit-function stage, wherein it does not significantly impair the flight capabilities of the carrier compared to its original flight capabilities with the functional component. The on-board command and control unit can be integrated into said replacement component.

the carrier can comprise at least one cargo hold space configured for receiving therein the filled UAV units. Under this example, the replacement component can be a cargo door. Specifically, it can be, for example, a side or a rear door.

Alternatively, according to another example, the carrier can be configured for externally mounting thereon of said one or more UAV units. Under this example, the replacement component can be constituted by a part of the landing gear.

the on-board command and control unit comprises at least one of the following:

communication means;

server module; and a data acquisition device.

under the above, the server module can be configured for running a cloud-based software.

the data acquisition device is any one of a SWIR and/or an IR camera.

Using a cloud of UAVs which can be accurately directed to specific designated dispersion points (e.g. with the help of a GPS based navigation device), according to some embodiments, enables to achieve accurate dispersion of payload material at the event site and thereby improve the efficiency of the desired effect of the payload material.

According to some embodiments, accuracy and efficiency of payload dispersion is further enhanced by using a command and control unit for: analyzing the selected dispersion area and dividing the area into segments; assigning a group of UAVs to specific target segments within the dispersion area; controlling the dispersion of each UAV and coordinating between the dispersion time of different UAVs in the a group of UAVs assigned to the same segment. Such a configuration allows regulating the payload density per segment, being determined by the number of UAV units in that specific segment.

According to some embodiments, by controlling the UAVs' weight and velocity a desirable momentum can be achieved, for increasing the effectiveness of the dispersed payload material.

The use of a carrier aircraft for carrying and deploying many UAVs each carrying payload material, according to some embodiments, enables to deliver large amounts of payload material over large distances and disperse the payload at remote and/or inaccessible areas.

The system configuration, according to some embodiments, which includes the storage and maintenance facility together with the automatic filling system, enables to achieve high logistic availability and short reaction time.

According to another aspect of the presently disclosed subject matter there is provided a payload dispersion system comprising: a plurality of UAVs each comprising at least one container containing payload material and configured to fly to a designated dispersion point in an event site and disperse the payload material at the designated dispersion point; wherein one or more of the plurality of UAVs comprise at least one sensor device configured to detect situation awareness data from the event site surroundings;

a computerized device configured to receive from one or more of the plurality of UAVs data sensed by one or more sensors on-board the UAVs and to provide respective output including real-time SAD and/or performance feedback.

The systems according to the above aspect of the presently disclosed subject matter can optionally comprise one or more of features listed below, mutatis mutandis, in any technically possible combination or permutation.

Wherein the computerized device is further configured to receive from at least one UAV a first data detected by a first respective sensor onboard the at least one UAV, wherein the first data is detected during a first time period; receive from at least one other UAV a second data detected by a second sensor onboard the at least one other UAV, wherein the second data is detected during a second time period;

determine whether a change exists between the first data and the second data; wherein the first time period is later than the second time period and wherein payload material is dispersed over the event site by one or more of the plurality of UAVs during a time between the first time period and the second time period; transmit to a user device output data including performance feedback indicative of the effect of the dispersed payload on the event site, the performance feedback is related to the determined change.

Wherein the system further comprises one or more user devices, wherein the computerized device is configured to transmit the performance feedback to the user device and display the performance feedback on a display screen of the user device.

Wherein the computerized device is configured responsive to the performance feedback to provide updates to deployment parameters.

Wherein the user device is configured to receive input data comprising instructions for updating the deployment parameters and to transmit the input data to the computerized device.

Wherein the computerized device is configured to process the performance feedback and to autonomously update the deployment parameters based on the performance feedback.

Wherein the event site includes a dispersion area comprising one or more segments and wherein the computerized device is configured to assign one or more UAVs from the plurality of UAVs to each segment, based on the required payload capacity; and wherein the computerized device is further configured to determine performance feedback pertaining to a given segment based on data detected by sensors on-board the one or more UAVs assigned to the given segment.

Wherein the computerized device is configured to update a required payload capacity assigned to the given segment based on the performance feedback pertaining to the given segment.

Wherein each UAV comprises a payload dispersion unit and is configured to autonomously direct the UAV to the designated dispersion point and operate the payload dispersion unit for dispersion of the payload at the designated dispersion point.

Wherein the UAVs are deployed from an airborne carrier aircraft and wherein the computerized device is a command and control unit mountable on the aircraft.

According to another aspect of the presently disclosed subject matter there is provided a system for deploying a plurality of unmanned aerial vehicles (UAVs) for dispersing payload material, each UAV comprising at least one container containing payload material and configured to fly to a designated dispersion point in an event site and disperse the payload material at the designated dispersion point; and wherein one or more of the plurality of UAVs comprise at least one sensor device configured to detect situation awareness data from the event site surroundings;

the system comprising a computerized device configured to receive from one or more UAVs data sensed by one or more sensors on-board the UAVs and to provide respective output including real-time SAD and/or performance feedback.

The system according to the above aspect of the presently disclosed subject matter can optionally comprise one or more of features listed above with respect to other aspects, mutatis mutandis, in any technically possible combination or permutation.

According to another aspect of the presently disclosed subject matter there is provided a method comprising:

deploying a plurality of UAVs wherein each UAV comprises at least one container containing payload material and configured to fly to a designated dispersion point in an event site and disperse the payload material at the designated dispersion point; and wherein one or more of the plurality of UAVs comprise at least one sensor device configured to detect situation awareness data from the event site surroundings;

operating a computerized device for:

receiving from one or more UAVs data sensed by one or more sensors on-board the UAVs and to provide respective output including real-time SAD and/or performance feedback.

The method according to the above aspect of the presently disclosed subject matter can optionally comprise one or more of features listed above with respect to other aspects, mutatis mutandis, in any technically possible combination or permutation.

According to another aspect of the presently disclosed subject matter there is provided a non-transitory program storage device readable by a machine, tangibly embodying a program of instructions executable by the machine to perform method steps of a method comprising:

deploying a plurality of UAVs wherein each UAV comprises at least one container containing payload material and configured to fly to a designated dispersion point in an event site and disperse the payload material at the designated dispersion point; and wherein one or more of the plurality of UAVs comprise at least one sensor device configured to detect situation awareness data from the event site surroundings;

operating a computerized device for:

receiving from one or more UAVs data sensed by one or more sensors on-board the UAVs and to provide respective output including real-time SAD and/or performance feedback.

The program storage device according to the above aspect of the presently disclosed subject matter can optionally comprise one or more of features listed above with respect to other aspects, mutatis mutandis, in any technically possible combination or permutation.

According to another aspect of the presently disclosed subject matter there is provided a computerized database system configured to store mission data obtained during one or more payload dispersion missions; wherein in each payload dispersion mission a plurality of UAVs are deployed, each UAV comprising at least one container containing payload material and configured to fly to a designated dispersion point in an event site and disperse the payload material at the designated dispersion point;

The database system comprises at least one computer processing unit configured according to one example to:

receive in real-time, missions data input pertaining to a specific ongoing payload dispersion mission; analyze the mission data input to extract from the database system appropriate mission execution recommendations; provide based on the mission execution recommendations operational instructions, including deployment parameters, for controlling the UAVs during execution of the specific ongoing payload dispersion mission.

According to another aspect of the presently disclosed subject matter there is provided a computerized method of operating a database system configured to store mission data obtained during one or more payload dispersion missions; wherein in each payload dispersion mission a plurality of UAVs are deployed, each UAV comprising at least one container containing payload material and configured to fly to a designated dispersion point in an event site and disperse the payload material at the designated dispersion point;

According to one example, the method comprises operating a processing unit in the database system for:

receiving in real-time, missions data input pertaining to a specific ongoing payload dispersion mission; analyzing the mission data input to extract from the database system appropriate mission execution recommendations; providing, based on the mission execution recommendations, operational instructions, including deployment parameters, for controlling the UAVs during execution of the specific ongoing payload dispersion mission.

In addition to the above features, the database system and respective method according to these aspects of the presently disclosed subject matter can optionally comprise one or more of the features listed below, in any technically possible combination or permutation:

Wherein the processing unit is further configured to receive situation awareness data obtained in real time during the specific ongoing payload dispersion mission, the situation awareness data including at least data sensed by one or more sensors on-board the plurality of UAVs; analyze the situation awareness data and provide respective output including performance feedback and/or updates to the deployments parameters.

wherein the processing unit is configured to process the performance feedback and to autonomously update the deployment parameters based on the performance feedback.

wherein mission data is generated during many payload dispersion missions; the processing unit is configured to:

analyze the stored mission data and generate a plurality of mission profiles, each mission profile representing a distinguishable operational event scenario; generate and associate one or more mission execution recommendations with respective mission profiles, the mission execution recommendation comprising deployment parameters to be used during execution of a real-time payload dispersion mission.

Wherein extracting from the database system appropriate mission execution recommendations comprises: identifying in the storage of the data base a mission profile representing the payload dispersion mission and using mission execution recommendations for generating instructions for controlling the UAVs during the payload dispersion mission.

According to another aspect there is provided a payload dispersion system comprising:

a plurality of UAVs each comprising at least one container containing payload material and configured to fly to a designated dispersion area in an event site and disperse the payload material at the designated dispersion area; wherein one or more of the plurality of UAVs comprise at least one sensor device configured to detect situation awareness data from the event site surroundings;

a computerized device configured to:

receive from one or a plurality of UAVs sensed data collected at the event site; determine based on the sensed data estimated future event conditions.

wherein the computerized device is configured responsive to the estimated future event conditions to provide new and/or updated deployment parameters. According to another aspect of the presently disclosed subject matter there is provided a method comprising:

deploying a plurality of UAVs wherein each UAV comprises at least one container containing payload material and configured to fly to a designated dispersion point in an event site and disperse the payload material at the designated dispersion point; and wherein one or more of the plurality of UAVs comprise at least one sensor device configured to detect situation awareness data from the event site surroundings;

operating a computerized device for:

receiving from a plurality of UAVs sensed data collected at the event site; and determine based on the sensed data estimated future event.

BRIEF DESCRIPTION OF THE DRAWINGS

In order to understand the presently disclosed subject matter and to see how it may be carried out in practice, the subject matter will now be described, by way of non-limiting examples only, with reference to the accompanying drawings, in which.

Figure 1A:
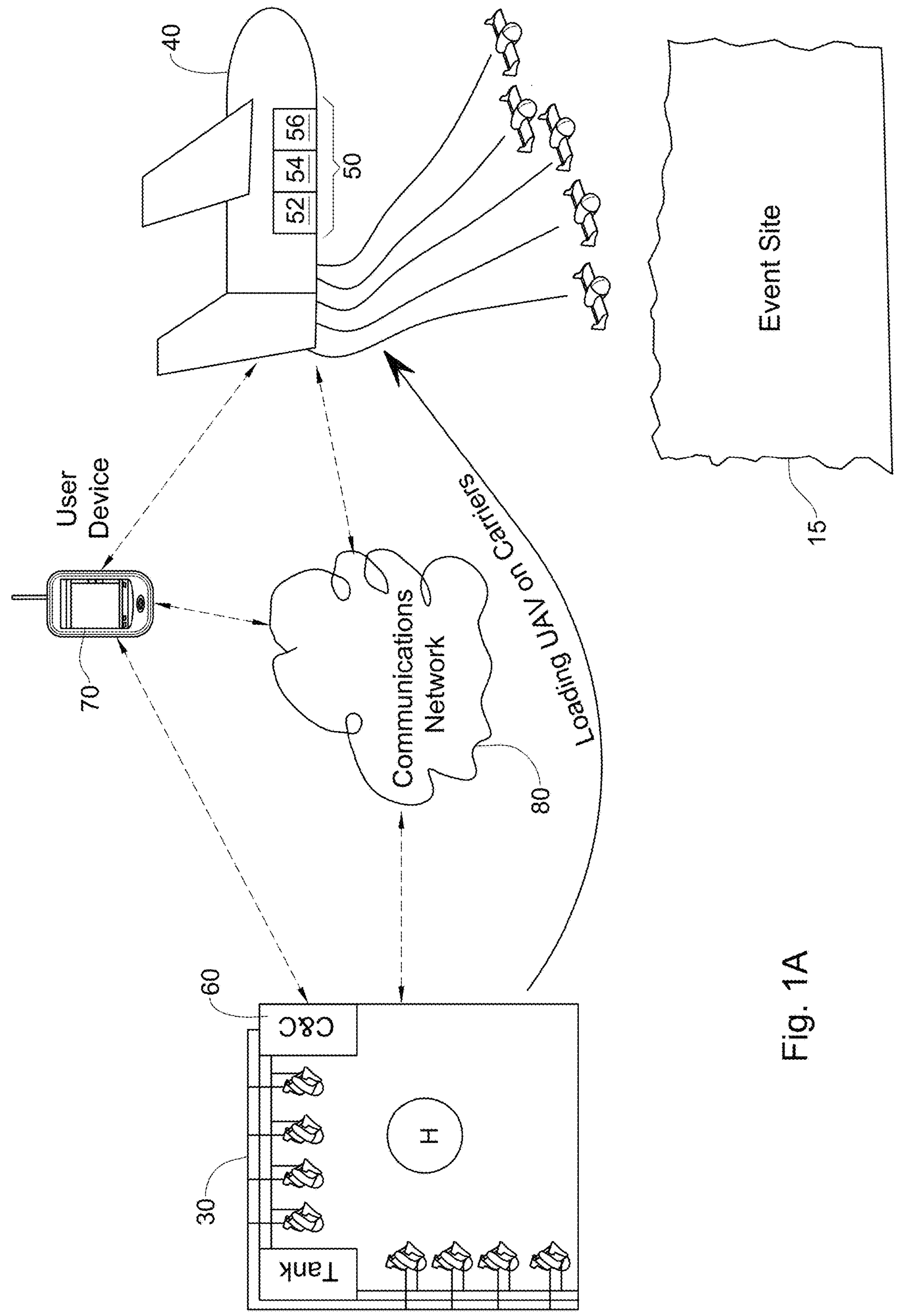
FIG. 1*a* is a schematic illustration of a high level overview of a UAV based payload dispersion system, according to an example of the presently disclosed subject matter.

It is noted that elements in the drawings are not necessarily drawn to scale.

DETAILED DESCRIPTION

Unless specifically stated otherwise, as apparent from the following discussions, it is appreciated that throughout the specification discussions utilizing terms such as “operating”, “processing”, “assigning”, “generating”, “transmitting”, “receiving”, “analyzing” or the like, include action and/or processes of a computer device configured with data processing capabilities that manipulate and/or transform data into other data, said data represented as physical quantities, e.g. such as electronic quantities, and/or said data representing the physical objects.

The terms “computer,” “computer/computerized device”, “processing unit”, “machine” or variation thereof should be expansively construed to cover any kind of electronic device with data processing capabilities, including, by way of non-limiting example, a processor (e.g. digital signal processor (DSP), a microcontroller, a field programmable gate array (FPGA), an application specific integrated circuit (ASIC), microprocessor, etc.), or any other device comprising a processor and computer memory such as a personal computer, a server, a computing system, a communication device, any other electronic computing device, and or any combination thereof.

As used herein, the phrase “for example,” “such as”, “for instance” and variants thereof describe non-limiting embodiments of the presently disclosed subject matter. Reference in the specification to “one case”, “some cases”, “other cases” or variants thereof means that a particular feature, structure or characteristic described in connection with the embodiment(s) is included in at least one embodiment of the presently disclosed subject matter. Thus the appearance of the phrase “one case”, “some cases”, “other cases” or variants thereof does not necessarily refer to the same embodiment(s).

It is appreciated that certain features of the presently disclosed subject matter, which are, for clarity, described in the context of separate embodiments, may also be provided in combination in a single embodiment. Conversely, various features of the presently disclosed subject matter, which are, for brevity, described in the context of a single embodiment, may also be provided separately or in any suitable sub-combination.

In embodiments of the presently disclosed subject matter, fewer, more and/or different stages than those shown in FIGS. 3, 4, 5, 9 and 11 may be executed. In embodiments of the presently disclosed subject matter, one or more stages illustrated in FIGS. 3, 4, 5, 9 and 11 may be executed in a different order and/or one or more groups of stages may be executed simultaneously. Elements in FIG. 2*a* and FIG. 2*b* can be made up of a combination of software and hardware and/or firmware that performs the functions as defined and explained herein. At least part of the elements in FIG. 2*a*, FIG. 2*b* and FIG. 10 can be operatively connected to a computer or can be a part of computer, for example, implemented as a processing unit comprising a computer processor and a non-transitory computer memory. In different embodiments the system as disclosed herein with reference to FIG. 2*a*, FIG. 2*b* and FIG. 10 may comprise fewer, more, and/or different modules than those shown. For example, while UAV navigation module 116 is described as an element separated from flight computer, in other examples it may be structurally integrated within flight computer 110.

The term "substantially" is used herein in some cases to imply the possibility of variations in specified values within an acceptable range. The specified value can be absolute value (e.g. substantially not exceeding 45°, substantially perpendicular, etc.) or relative (e.g. substantially not exceeding the height of x, substantially at the same time, etc.).

Bearing the above in mind attention is now brought to FIG. 1*a* which is a schematic illustration of a high level overview of a UAV based payload dispersion system, according to an example of the presently disclosed subject matter.

In general, UAV based payload dispersion system 100 is arranged for the deployment of a plurality of UAVs 10 loaded with payload material (referred herein below as "UAV cloud") into the sky directly above or at some distance from an event site 15, and for the dispersion of the payload material, carried by the UAVs, at designated dispersion areas in the event site. The term "UAV cloud" disclosed herein includes a group of UAVs (at least two) which are deployed into the sky substantially at the same time over or at some distance from an event site and operate in coordination for dispersing payload material over one or more dispersion area segments covering part or all the event site area.

To this end system 100 comprises a plurality of UAVs 10, each UAV 10 is configured to carry payload material and disperse the payload material over a certain area in a controllable manner. The specific type of payload material is selected based on the specific type of event and the desired result. For example, in case of wildfire, the payload can be some type of fire extinguishing material (e.g. water, foam, powder, gel) which can help to quench or contain the fire and prevent its spreading and in case of an oil spill, the payload material can be some type of oil disintegrating or oil absorbing material.

Each UAV 10 is a maneuverable unmanned aircraft equipped with a navigation system and automatic flight control. The UAVs 10 can be self-propelled comprising some type of engine. Alternatively, the UAVs 10 can be an engineless glider (otherwise referred to as "unmanned aerial glider" or UAG in short). As explained below, in some examples, the UAVs 10 are disposable gliders made of consumable and/or biodegradable material fitted for flying along "Kamikaze" flight paths into predetermined designated dispersion segment areas. In addition to FIG. 2*a* described below, a description of various examples of different aspects of a UAV as disclosed herein can be found in WO16024276, which is incorporated herein by reference in its entirety.

In idle state, the UAVs 10 are stored in a storage and maintenance facility, including for example a hangar or a warehouse arranged for such storing. As explained below with reference to FIG. 1*b* storage and maintenance facility H can comprise a filling arrangement 230 configured for automatically filling the UAV containers before deployment.

As will be further explained below system 100 comprises a ground command and control unit 60. The ground command and control unit is a computerized device which is configured in general to monitor and control the operation of different components of system 100. Ground command and control unit 60 can be operatively connected to UAVs stored in storage and maintenance facility H and execute, while in idle state, routine maintenance checks for ensuring airworthiness and general health of the stored UAVs. More specifically, the routine maintenance checks can determine the operability of one or more of the following: battery charging conditions, status of flight control devices, status of electronic card, status of payload filling and payload dispersion systems, etc.

Ground and command control unit 60 comprises or is otherwise connected to a communication device 62 configured for establishing communication between command and control unit 60 and different components in system 100. Communication device 62 can be for example a cellular base station for communicating over a cellular communication network.

According to some examples, ground command and control unit 60 is further configured to manage the software configuration installed on all UAVs as well as software updates in order to maintain an updates and uniform software version in all UAVs.

System 100 can further comprise one or more user devices 70 configured to run appropriate software and implement a user interface allowing an operator to interact with various components in system 100. User device 70 can be any type of computerized device with appropriate data processing and communication capabilities (e.g. cellular communication device) including for example, Smartphone, tablet computer, portable computer, personal computer, a designated control station, or the like. The data generated by different components of system 100 can be transmitted to user device 70 to be displayed and viewed by an operator to enable monitoring of the system operation. As explained below, user device 70 can be also configured to receive user input from an operator and transmit the user data input to a designated system component to enable controlling the system operation.

Figure 1B:
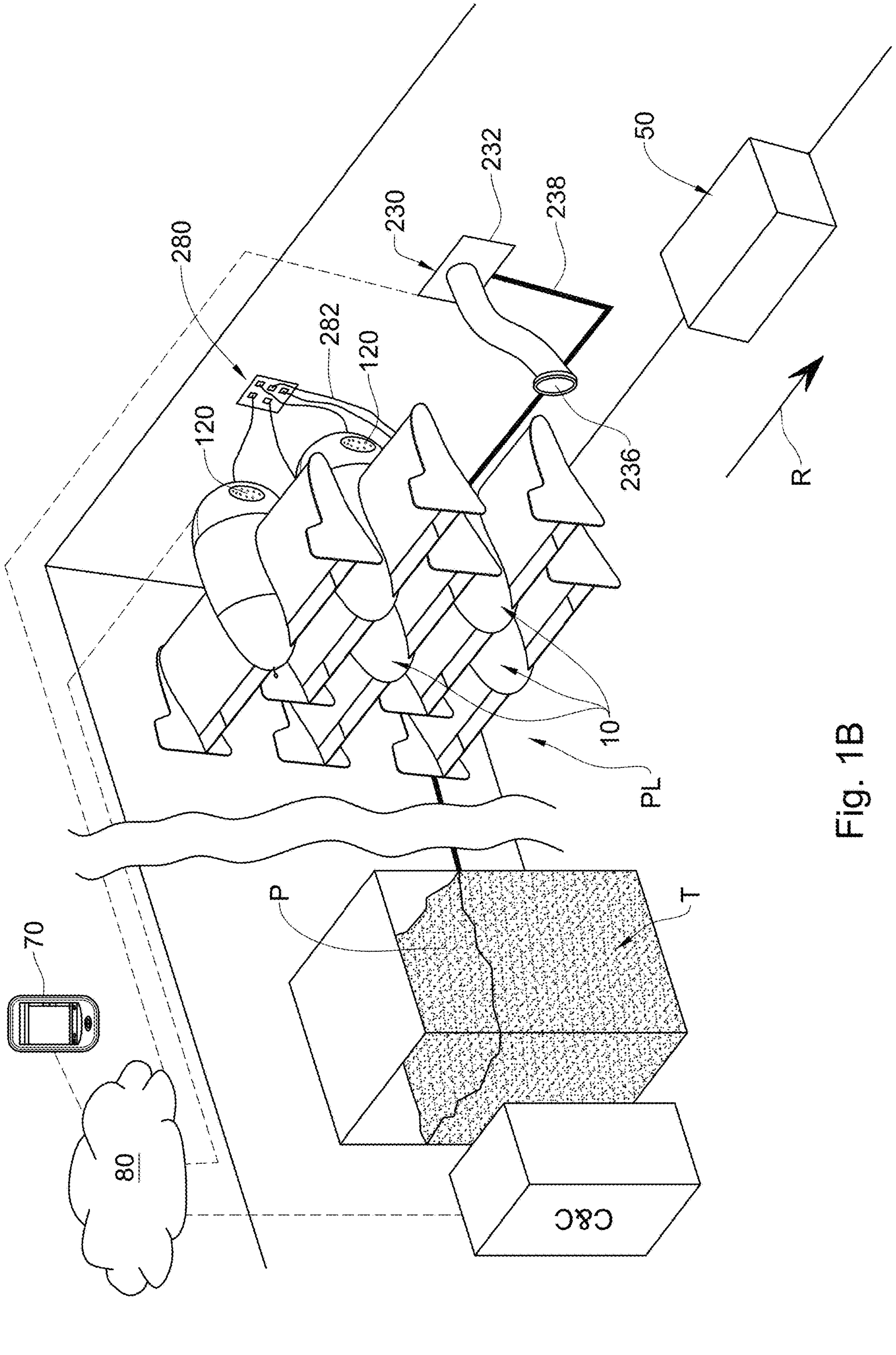
FIG. 1*b* is a schematic isometric view of a hangar in which UAV units of the system of FIG. 1 can be stored, according to an example of the presently disclosed subject matter.

With particular reference now being made to FIG. 1B, a storage area is shown in the form of a hangar H (shown partially for clearer representation) where UAV units 10 are stored prior to their loading onto a carrier aircraft. Hangar H houses a plurality of UAV units a payload tank T, 10, a filling arrangement 230, a ground command and control (C&C) unit 60. Hanger H can further house a portable command and control system 50, configured for becoming an on-board control system as further discussed below with respect to FIGS. 7A and 7B (when mounted in the carrier aircraft directly or as part of a component configured for replacing corresponding component of the carrier aircraft, in which case such components can also be stored in the hangar H). Hangar H also has an opening HE through which UAV units can be taken out and/or entered in hangar H (the direction of which is designated by arrow R).

It is noted that while ground command and control unit 60 and on-board command and control system 50 are described as physically separated units, according to some examples these units can be configured as multiple units of the same single command and control unit, which are distributed across multiple locations. According to this example, the individual units can be adapted to share information as well as computer processing resources. Furthermore, in some examples, these two units are connected to one or more other computer devices (e.g. a main server computer) which can be configured to synchronize and monitor their operation and/or share information with other entities. According to yet another example, ground control unit 60 can serve also as on-board control system 50. According to this example, ground control unit is loaded (possibly together with communication unit 62) onboard the carrier aircraft during the loading stage together with the loading of the UAVs.

In FIG. 1B, The UAV units 10 are shown arranged in a pallet PL, already prepared for being bulk loaded onto a carrier aircraft (see for example FIGS. 7A and 7B) when so required. However, the use of pallets for storing and/or loading the UAV units 10 is not obligatory, as the UAV units 10 can be configured for loading directly onto the carrier aircraft if the latter is specifically adapted for such loading. The UAV units 10 are also connected to a power supply 280 configured for supplying power to electrical and/or electro-mechanical components of the UAV unit 10 for the purpose of performing checkups (as will be explained in detail later) even in an idle state. Each of the UAV units 10 comprises a filling valve 120.

Hangar H is also provided with a filling infrastructure 230 associated via appropriate piping 238 to the payload tank T. The filling infrastructure 230 further comprises a port 232, a payload delivery pipe 234 and a nozzle 236 configured for securely engaging the filling valve 120 for introducing payload into each of the UAV units 10.

The ground C&C unit 60, command and control system 50, the filling infrastructure 230 and each of the UAV units 10 can all communicate with each other and with the user device 70 via a communication network 80 (with the help of a communication device as described herein).

As previously mentioned, in an idle state, where no event takes place, the C&C unit 60 is configured for monitoring the maintenance and airworthiness of each of the UAV units 10 housed in the hangar H. Specifically, each of the UAV units 10 is configured for periodically running an airworthiness checkup including checking of all or any of the electrical/electro-mechanical components thereof, and providing corresponding data (also referred herein as 'idle data') to the C&C unit 60 via the communication network 80.

The C&C unit 60, in turn, is configured for determining, based on the idle data received from the UAV units 10, which of the UAV units 10 are available for use (i.e. not faulty) in case an operational event takes place (i.e. an event requiring the use of UAV units under the disclosure of the present application).

If the C&C unit 60 detects a faulty or flawed UAV unit 10, it can issue an alert for the effective performance of at least one of the following:

a) replacing the faulty UAV unit 10 in the pallet PL with an operational UAV unit 10; and b) repairing the faulty UAV unit 10.

It is noted that the above steps (a) and (b) can either be performed automatically, i.e. by an automated system capable of removing, replacing and/or repairing a defective UAV or by issuing an alert to professional personnel on the ground which can handle the UAV unit 10.

In operation, when an event is detected, e.g. a fire breaking out or any other event requiring the use and implementation of the UAV units 10 as previously mentioned, the C&C unit 60 is first configured for analyzing the event and determining, based thereon, the required amount of payload to be delivered to the site of the event and, as a derivative thereof, the number of UAV units 10 which should be employed.

In addition, it is appreciated that a number of carriers can also be used for carrying a plurality of UAV units used in handling a single event, the number of such carriers being determined by the system or by the user in accordance with the required amount of payload to be delivered.

Thereafter, the C&C unit 60 issues a control signal to the filling system 230 via the communication network 80, instructing it to commence filling of specific and a predetermined number of UAV units 10 with payload material. Once a UAV unit 10 is filled, the C&C unit 60 can label it as 'ready for deployment' so that in case of an event, the C&C unit 60 knows exactly which of the UAV units are available at its disposal.

Figure 7A:
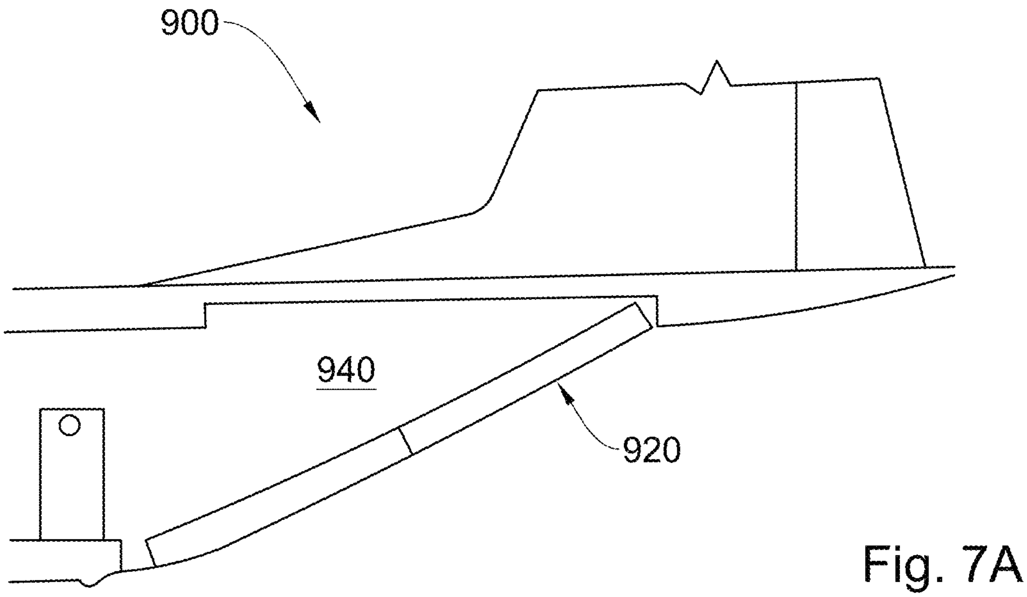
FIG. 7*a* is a schematic isometric view of a cargo carrier which, when modified, can be configured for housing therein a plurality of UAV units.
Figure 7B:
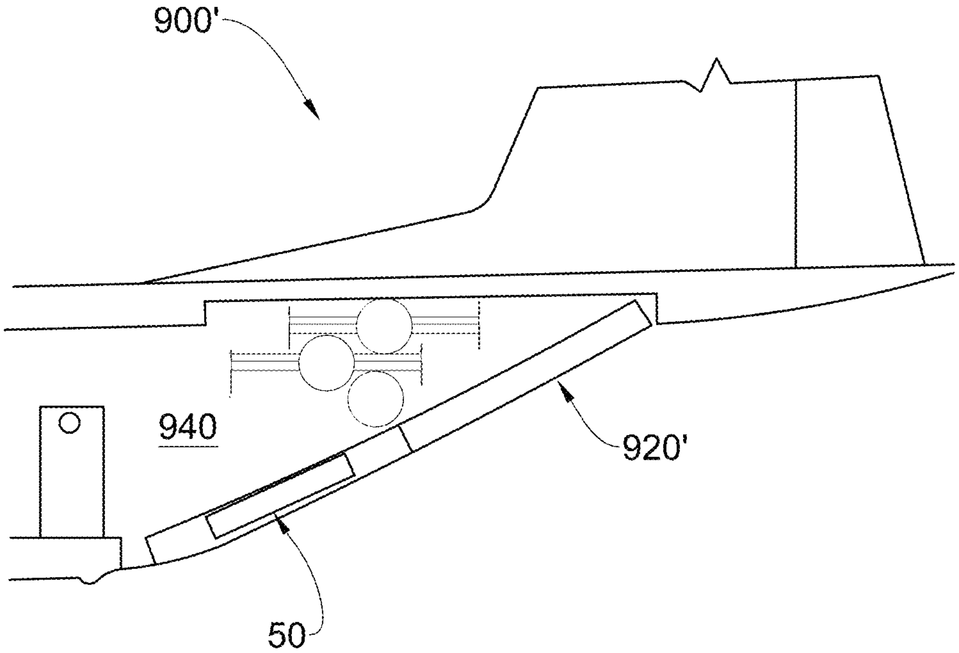
FIG. 7*b* is a schematic isometric view of the carrier shown in FIG. 7*a*, in which the cargo door has been replaced for accommodating the plurality of the UAV units.

It is noted here that a default setting can be provided under which the number of UAV units 10 which are filled in case of an event is simply the maximal number of UAV units 10 which can be mounted onto an available carrier aircraft (e.g. such as shown FIGS. 7A and 7B).

In the example shown in FIG. 1B, the UAV units 10 are not connected to the pipe 234, and can be prompted for such a connection upon a corresponding signal from the C&C unit 60 via the communication network 80. This connection can either be performed by an automatic arrangement or by staff/personnel members in the hangar H, manually attaching the nozzle 236 to the filling valve 120.

It is important to note that in accordance with another example (not shown), the UAV units 10 can be arranged in the hangar H with their filling valves being continuously attached to the pipe 234 of the filling infrastructure 230, wherein, in case of an operational event, all that is required in terms of filling is for the filling infrastructure 230 to be instructed, by the C&C unit 60, to open its respective valve (not shown) and begin filling the UAV units 10.

According to yet another example, it is also possible that the UAV units 10 are stored in the hangar H already filled with payload, wherein the C&C unit 60 merely decides on the specific UAV units to be used for the event, and does not need to control filling (although filling can be controlled thereby at an earlier, idle stage).

Each pallet/s PL can comprise a dropping arrangement (not shown) and the UAV units 10 are arranged therein in a manner allowing the dropping arrangement to release the UAV units 10 from their location in the pallet PL and drop them one by one based on a commands provided by the C&C unit 60 or by an air crew responsible for this matter.

Simultaneously with the above, the C&C unit 60 identifies a possible carrier onto which the pallet is to be loaded and which should carry the pallet PL to a drop site geographically corresponding to the site of the operational event. Once such a carrier is identified, the pallet PL is taken from the hangar H and is brought to the carrier for loading.

Before deployment of UAVs at an event site and after filling the UAVs with payload, the pallets PL with the UAVs 10 are extracted from storage and maintenance facility H and loaded on carrier aircraft 40 configured to carry the UAVs to the event site 15 or to a nearby location at a safe distance from the event site. In addition to the UAVs, carrier aircraft 40 is configured to carry a number of additional system components referred to herein collectively as "on-board control system". Examples of aircrafts that can be used as carrier aircraft as described herein include: Antonov 32, Alenia 27J, Buffalo, C-130, SEAT like air-tractor and thrush, twin turboprop engine aircrafts such as ATR-72 or similar and any kind of rotating wings aircrafts.

On-board control system 50 includes on-board command and control unit 52 and communication unit 56. On-board command and control unit 52 is a computerized device configured to analyze situation awareness data as well as input data received from the user device 70 and generate flight plans assigned to the UAVs and comprising operational instructions for controlling the operations of various systems on-board the UAVs 10 including for example, flight control unit and payload dispersion unit.

Communication unit 56 includes any type of communication device configured for establishing communication between a command and control unit 52 and different components in system 100. Similar to communication device 62 mentioned above, communication unit 56 can be for example a cellular base station for establishing cellular communication over a cellular network.

Optionally on-board control system 50 can also comprise one or more data acquisition devices 54. According to other examples, data acquisition devices can be located at a different place (e.g. onboard another aircraft flying over the event site and/or some other high vantage point overlooking the event site, if such exists).

Data acquisition device 54 can be any device configured for obtaining situation awareness data including for example, an electro optic sensor (e.g. IR, black & white, color) radar, sonar device, etc. The data acquisition device is selected according to the type of the event. For example, in case the operational event is a wildfire, data acquisition device can include a short wave infrared camera (SWIR) which is suitable for observing the environment in fire conditions, even through smoke.

Data acquisition device 54 is used for scanning the event site 15 and collecting situation awareness data. The collected situation awareness data is transmitted to on-board command and control unit 52 (via communication unit 56) and to user device 70 controlled by a human operator.

With specific reference being made to FIGS. 7A to 8B, the loading of the UAV units 10 onto the carrier aircraft will now be described.

FIG. 7A shows the identified carrier, which in the present example is constituted by an aircraft 900 comprising a rear loading door 920 and a cargo hold 940 suitable for receiving therein the pallet/s PL.

According to one example, prior to loading the pallet onto the aircraft 900, the aircraft is retrofitted by removing the loading door 920 and replacing it with an operational loading door 920', which is structurally similar to the door 920, i.e. having the same geometric and flight characteristics, to form a modified carrier '900 with flight capabilities essentially identical to those of the original aircraft 900. However, the operational characteristics of the modified carrier, and particularly of its loading door 920', can be different from those of the loading door 920 at least in that the former can have incorporated therein the control system 50 which effectively becomes the on-board control system 50. This process is also referred to herein as form-fit-function.

The on-board control system 50 is configured for being in communication with all other components of the system 100 via the communication network 80.

Data acquisition device 54 (shown in FIG. 1A) is configured to obtain data from the event site (images, chemical readings, temperature readings etc.) which are then provided to the on-board control system 50 so it can analyze the situation and prepare/modify the intended flight plans of the UAV units 10. The data acquisition device 54 can be configured to provide constant data to the on-board control system 50.

According to another example of the present application (not shown), the carrier aircraft 900 can remain the same, without any modifications made thereto, but during loading of the pallet PL therein, can also be loaded with the control system 50 as an add-on, rather than being incorporated within the cargo door or some other part of the aircraft. As previously described, the on-board control system can also comprise a camera unit 54 and a communication unit 56.

Figure 8A:
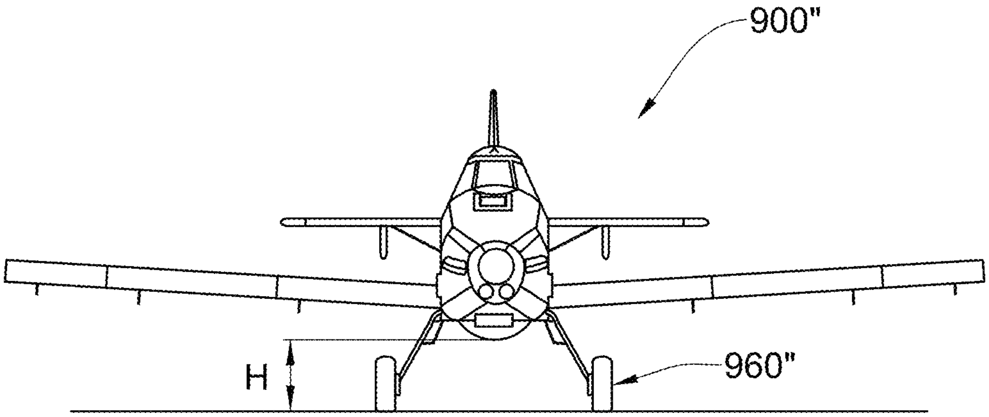
FIG. 8*a* is a schematic front view of a single engine air tanker which, when modified, can be configured for carrying a plurality of UAV units.
Figure 8B:
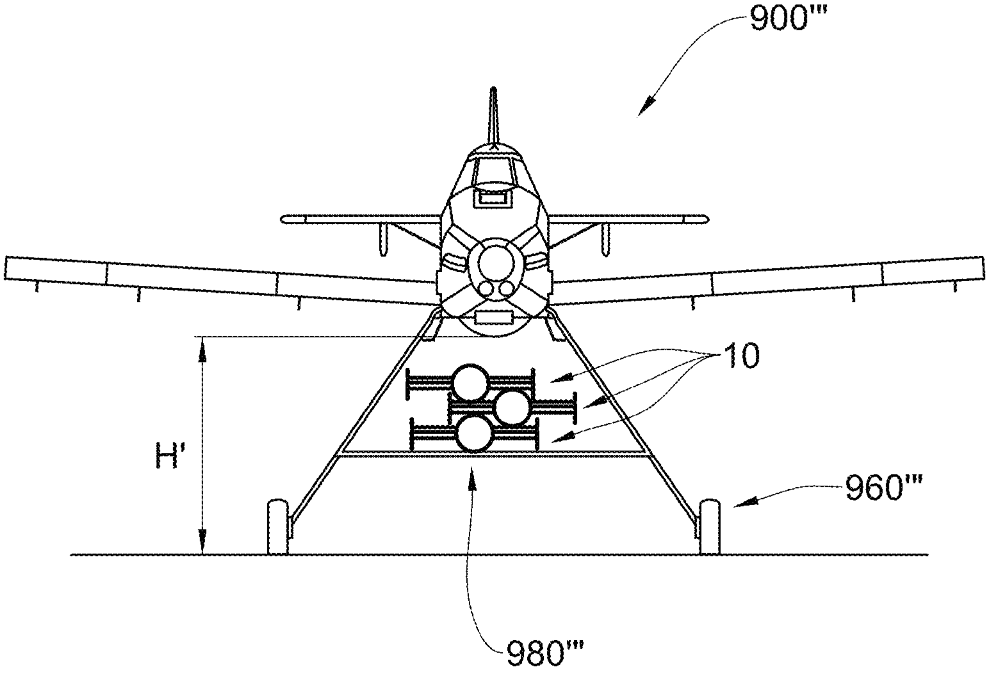
FIG. 8*b* is a schematic front view of the single engine air tanker shown in FIG. 8A, modified for carrying a plurality of UAV units.

It should also be noted that under certain variations, such as shown in FIGS. 8A and 8B, the carrier aircraft "900 can be free of a cargo hold, e.g. it can be in the form of a SEAT (single engine air tanker) wherein a discrete number of UAV units 10 can be mounted thereon externally, in a manner similar to that of additional fuel containers of a commercial aircraft. However, even under this example, it is still possible to perform a form-fit-function modification, under which an original portion of the carrier onto which the UAV units 10 are to be mounted is replaced with a similar component containing therein the on-board control system 50.

In the present example, such portion is the original landing gear 960" of the aircraft "900, which is replaced with a longer landing gear '"960, so that the clearance height of the aircraft increases from H to 'H, allowing attachment of several UAV units 10 thereto. Increasing the height to 'H allows attaching to the carrier aircraft a carrier arrangement 980" configured for supporting several UAV units 10 which are attached under the belly of the modified carrier '"900.

Once the carrier 900'/900'" is loaded with the pallet PL and/or a number of UAV units 10, it takes off and follows instructions and commands from the on-board control system 50 which will be detailed with reference to FIGS. 4 and 5.

Upon arrival of the carrier aircraft 40 to a deployment area, the UAVs 10 are deployed from the aircraft as a UAV cloud. Each UAV is provided with a respective flight plan and is configured, once in the air, to autonomously travel to an assigned payload dispersion point and release the payload at the assigned dispersion points, in a coordinated and controlled manner, according to the operational instructions in the flight plan, received from on-board command and control unit 52.

Communication between different components of system 100 can be facilitated over any suitable communication network 80 which may include hardwired and wireless communication infrastructures. According to one example, communication between system components is made over a cellular communication network such as a long-term evolution (LTE) infrastructure. According to one none limiting example, communication of the entire system is implemented with 4 physically separated channels:

Flight Control channel—configured to enable communication between command and control unit (60, 52) and the UAVs 10 (whether stored on the ground, onboard carrier aircraft or after deployment). This channel is used for example for, routine health maintenance of the UAVs, and monitoring and control of the UAVs after deployment. Downlink data obtained from the UAVs can be transmitted over this network to one or more user devices for displaying the information to be viewed by an operator.

Dispersing Control channel configured to enable communication between command and control unit 52 the UAVs 10, during payload dispersion. Uplink data delivered to the UAVs may include instructions to disperse payload, for example in the event of a malfunction of the autonomous operation of the dispersion system; downlink data received from the UAVs at the command and control unit and/or user device may include technical status data related to the payload dispersion process. This channel can operate both in the air during real-time dispersion or on the ground for the purpose of testing the dispersion process.

Visual Awareness Situation Picture channel configured to enable communication between data acquisition device 54, on-board command control unit 52 and user device 70, for controlling the data acquisition device and obtaining the generated output. Uplink data may include device (e.g. camera) settings; downlink data may include information generated by the data acquisition device (e.g. generated images) and technical status data related to the operation of the data acquisition device.

Ground Filling Control channel configured to enable communication between payload filling infrastructure 230 installed in storage and maintenance facility H, during an emergency situation, and ground command and control unit 60 for monitoring and commanding the filling process. Uplink data may include instructions to initiate the filling process; downlink data may include technical status data related to the filling system and filling process.

User device 70 can communicate over the different channels to enable an operator to monitor the various operations and issue commands for controlling the system where necessary.

Figure 2A:
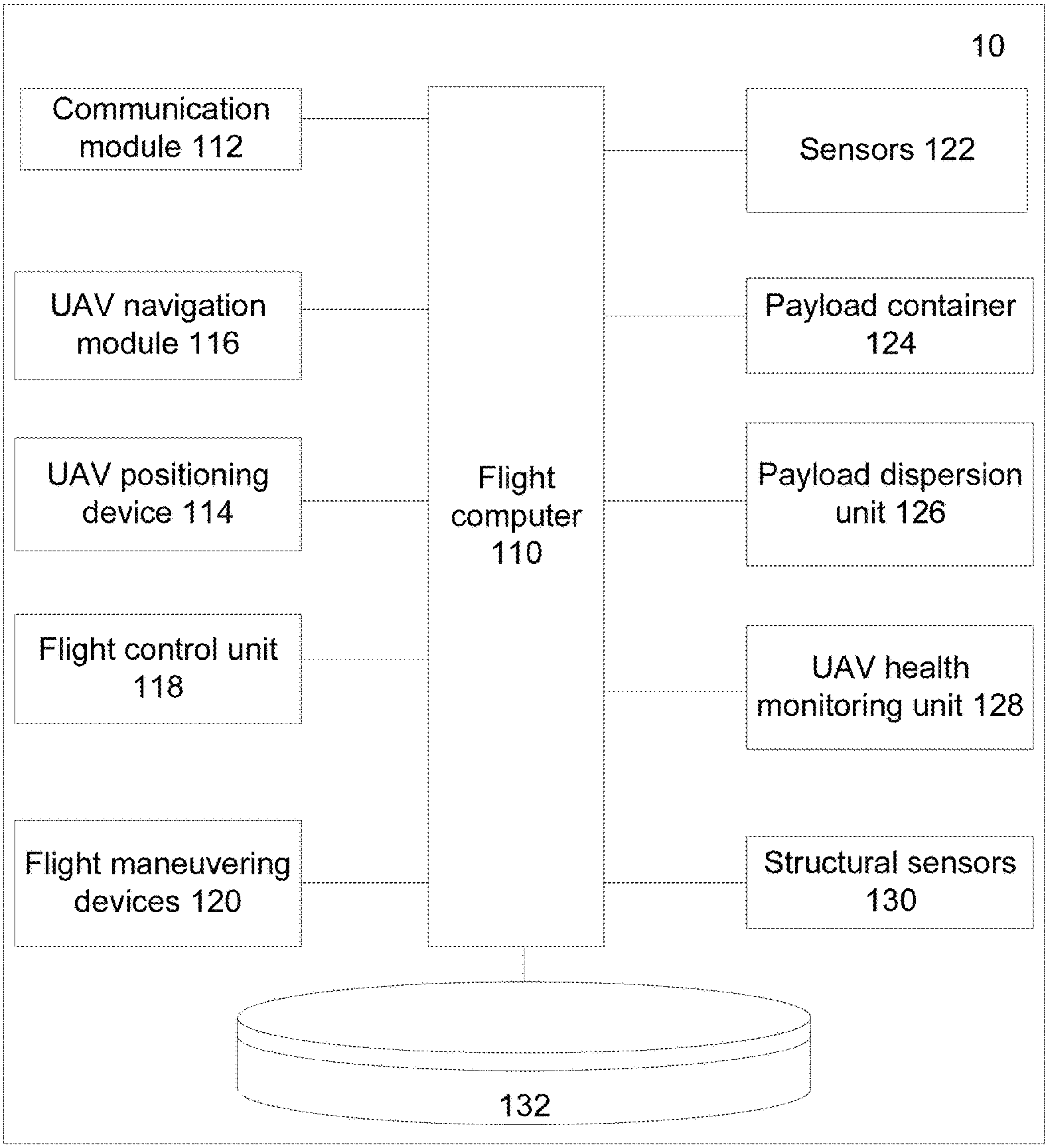
FIG. 2*a* is a functional block diagram of a UAG, according to examples of the presently disclosed subject matter.

Turning now to FIG. 2*a* it shows a functional block diagram of a UAV according to some examples of the presently disclosed subject matter. UAV 10 in FIG. 2*a* comprises a UAV flight computer configured 110 to control and coordinated various subsystem and units operating onboard the UAV.

UAV 10 further comprises a communication module 112 configured for communicating over communication network 80. For example, communication module 112 can be LTE communication module for facilitating communication over an LTE network infrastructure e.g. via communication unit 56.

UAV 10 also comprises one or more positioning devices 114 such as a global positioning receiver (e.g. GPS and/or GLONAS) and/or an INS device and/or cellular networks navigation device. Positioning devices can be operatively connected to navigation module 116. Navigation module 116 can be made accessible to a 3D map of the event site and configured to determine UAV headings, based on position data obtained by positioning devices 114, the 3D map and in accordance with a flight plan provided to the UAV as described herein.

In addition to positioning devices 114 UAV 10 can further comprise various sensors 122 including dynamic pressure sensors (coming for example from Pitot tubes), static pressure sensors, accelerators, gyros, altimeter and so forth. These sensors can be used by flight computer 110 for calculating various types of situation awareness data (e.g., UAV altitude, UAV velocity, UAV glide ratio, etc).

Navigation instructions can be used by flight control unit 118 configured to control various flight maneuvering devices 120 for directing the UAV in a desired direction. Flight maneuvering devices include for examples rudder, ailerons, elevators, flaps etc. The specific type of flight maneuvering devices depend also on the type of UAV, e.g. whether it is an engine driven vehicle or an engineless glider.

UAV 10 also comprises data-repository 130 (including non-transitory computer memory device), payload container 124 and payload dispersion system 126. Data-repository 130 can be used for storing data including for example, flight plan data, which includes operational instructions (including flight instructions and payload dispersion instructions) needed for completing payload dispersion.

Payload container is configured for holding a payload (e.g. water tank, gas tank, etc.). Payload dispersion unit 126 is configured in general to disperse the payload at a designated dispersion point. Payload dispersion unit 126, can comprise a computerized control unit configured for controlling the dispersion timing and the specific payload dispersion parameters.

For example, the payload dispersion system can comprise, an adaptable dispersion device (including for example an adaptable spray nozzle) enabling to control parameters such as dispersion triggering time (e.g. by a heat sensor configured to trigger payload dispersion in wildfire scenarios), rate (e.g. 300 liters of water within 100-500 milliseconds, in case of wild fire) of payload dispersion, density of the dispersed payload (e.g. number of droplets in a given surface area) and size of payload droplets (e.g. in case of liquid payload). These parameters may depend on the conditions of the operation event and can be provided to the UAV as part of the operational instructions received in a designated flight plan.

UAV 10 can further comprise UAV health monitoring unit 128 and structural sensors 130. UAV health monitoring unit 128 is connected to various systems, units and components onboard the UAV and configured to ensure airworthiness and general health of the stored UAVs operability. As mentioned above, this can be done as part of routine checkup controlled by the ground command and control unit. Structural sensors 130, can be operatively connected to health monitoring unit 128 and configured to monitor various structural components on the UAV and detect any structural flaws which may cause the UAV to malfunction, break or crash. For example, health monitoring unit can be connected to a strain gauge sensor configured to detect a deviation in the strain which is applied on different parts of the UAV and may damage the UAV. UAVs may further comprise a parachute of some other type of device for controlling and slowing down the fall of the UAV towards the ground.

Figure 2B:
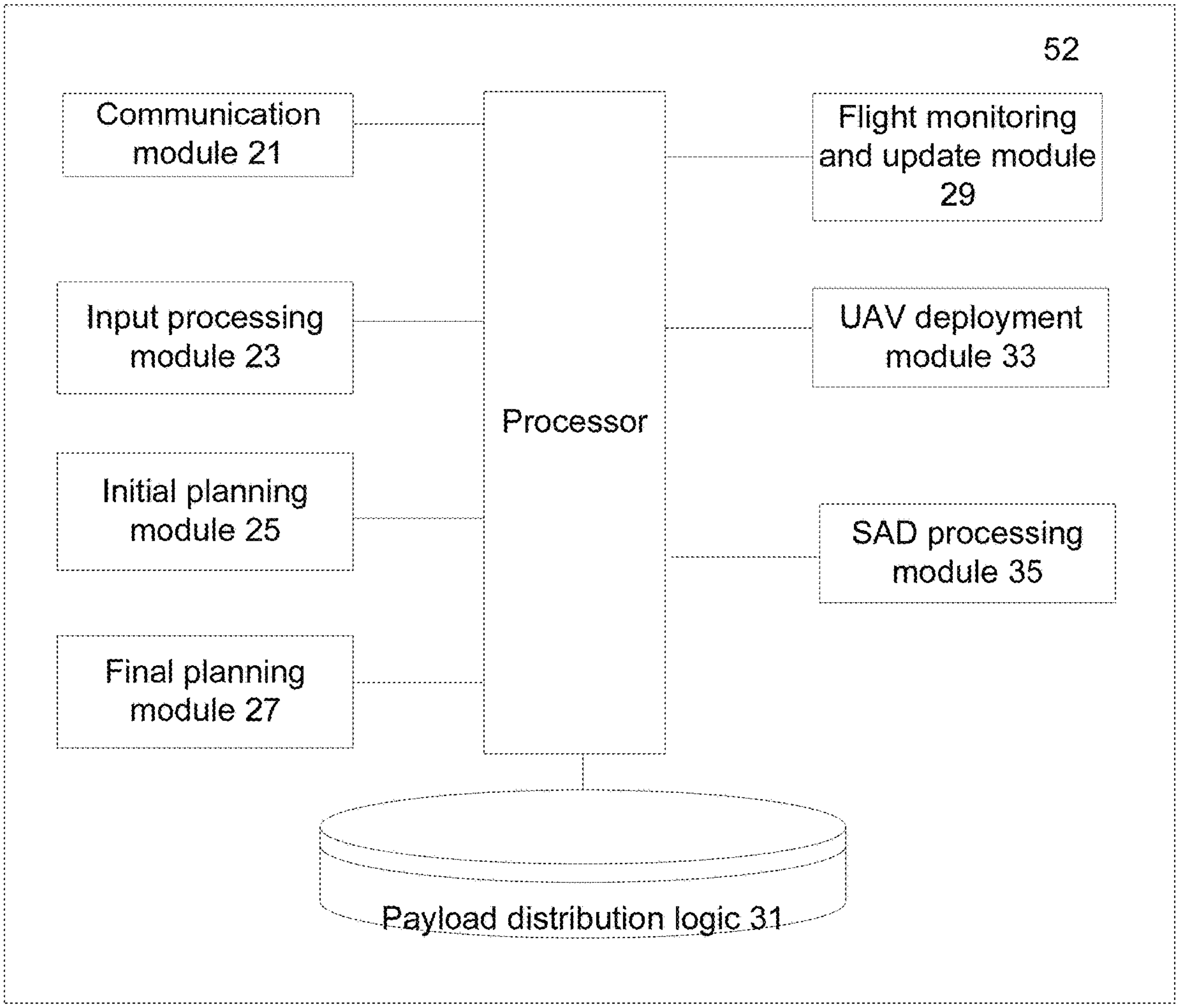
FIG. 2*b* is a functional block diagram of on-board command and control unit, according to examples of the presently disclosed subject matter.

Proceeding to FIG. 2*b* it shows a functional block diagram of on-board command and control unit 52 according to examples of the presently disclosed subject matter. It is noted that while FIG. 2*b* is directed to unit 52 similar principles also apply to unit 60. On-board command and control unit 52 is a computerized device comprising one or more computer processors and a communication module 21 (e.g. LTE cellular communication unit) for communicating over a communication network with other components of system 100.

As mentioned above on-board command and control unit 52 is configured in general to receive data (includes situation awareness data and/or user input data) and generate based on the received data flight plans comprising operational instructions. To this end, on-board command and control unit 52 comprises input processing module 23 configured to process data received for example, from a data acquisition device and extract from the data situation awareness data.

According to examples of the presently disclosed subject matter, flight plans are generated for each individual UAV, in a UAV cloud deployed from carrier aircraft 40, directing the UAV to a respective dispersion point in the event site, where the payload is dispersed by the UAV. As explained in more details below with respect to FIGS. 3 to 5, according to one example generation of the flight plans comprises an initial flight plan process executed before deployment and a final flight plan process executed after deployment. Accordingly, on-board command and control unit 52 comprises initial planning module 25 configured for generating the initial plan and final planning module 27 configured for generating the final plan.

On-board command and control unit 52 further comprises UAV flight monitoring and update module 29 configured to monitor the progress of the UAV and generate instructions to correct its operation in case a deviation from the flight plan is identified.

Figure 3:
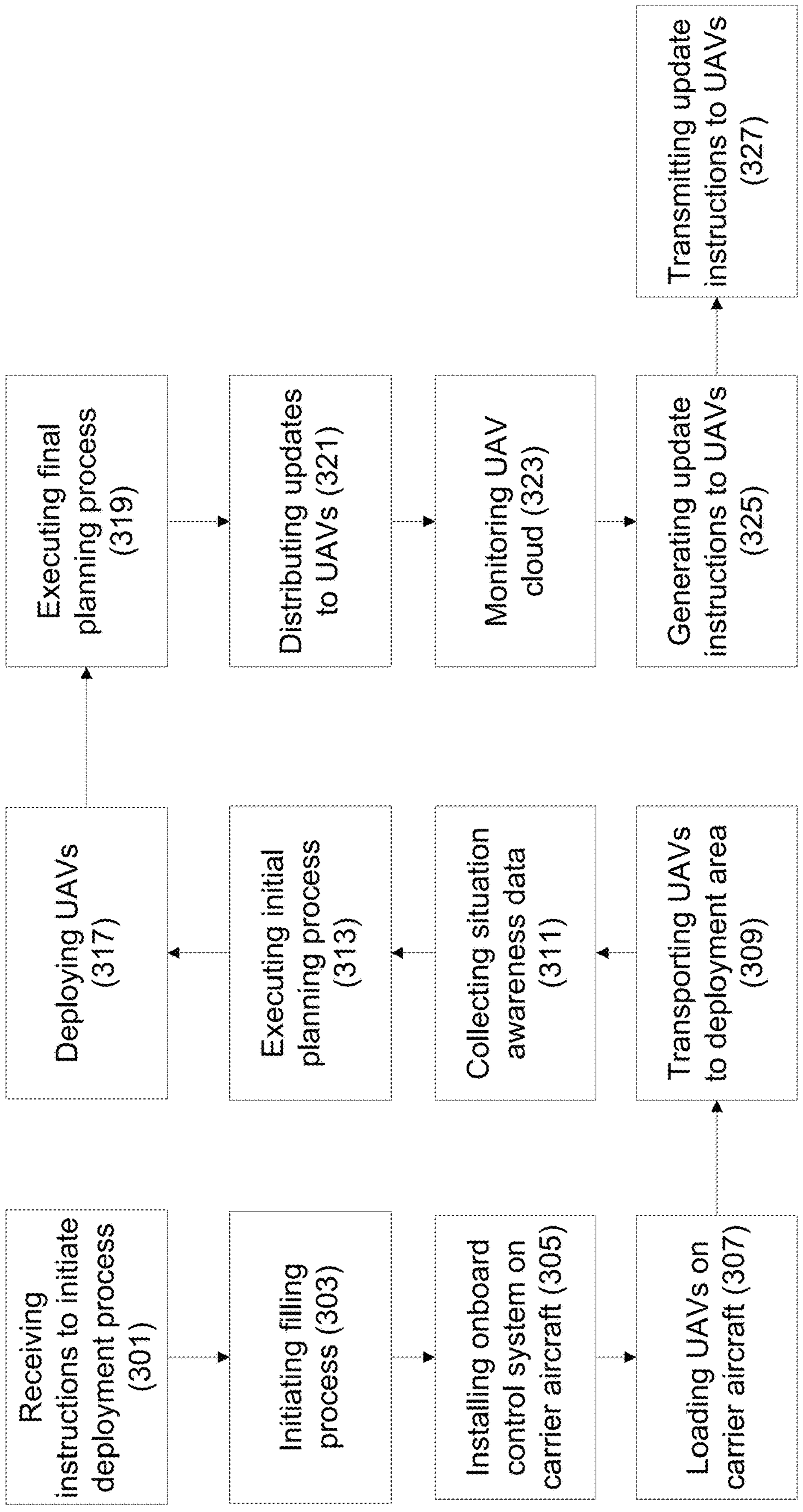
FIG. 3 is a flowchart illustrating a general operations flow, according to examples of the presently disclosed subject matter.

FIG. 3 is a flowchart illustrating a general operations flow of a UAV deployment process, according to examples of the presently disclosed subject matter. For better clarity, operations in FIGS. 3, (as well as FIGS. 4 and 5 below) are described with reference to corresponding elements which are illustrated in FIG. 1, FIGS. 2*a* and 2*b*. However, this is done by way of example only and should not be construed to limit the scope of the presently disclosed subject matter to the specific structure of the system exemplified in FIG. 1, FIGS. 2*a* and 2*b*.

As mentioned above, during the idle state UAVs are stored in storage and maintenance facility H, where the UAVs undergo a routine checkup process to ensure and maintain their operability. At block 301 instructions to initiate a deployment process are received. The instructions can be received for example at the ground command and control unit 60. Instructions to initiate a deployment process can be generated for example, by a human operator, who interacts with ground command and control unit 60, either directly or over a remote connection (e.g. over the Internet). Optionally, the instructions to initiate a deployment process can include information pertaining to the operational event which required the initiation of the process, including for example the location and type of the event.

In some events, responsive to the instructions to initiate the deployment process a payload filling process is initiated (block 303). A description of the filling process is described above with reference to FIG. 1B. In other events, UAVs stored in the storage and maintenance facility H are already loaded with the payload material and the filling process is not performed at this time.

A carrier aircraft, designated for transporting the UAVs to a deployment area is prepared for executing the mission (block 305). Preparation of the carrier aircraft can include for example the installation of an on-board control system 50 as described with respect to FIGS. 7A to 8B. Once an adequate number of UAVs are filled with payload, UAVs of a deployable UAV cloud are loaded on-board a carrier aircraft (block 307) as previously described.

The carrier aircraft with an installed on-board control system 50 and the UAVs takes off and flies to the deployment area (block 309). While in the sky, above or in the vicinity of the event site, data acquisition devices 54 are activated for collecting situation awareness data (block 311). For example, assuming that the operational event is a wildfire and the data acquisition devices include a SWIR camera, the camera is activated in order to survey the fire and generate a “fire picture” from the carrier aircraft point of view.

The obtained situation awareness data can be transmitted to one or more user devices, where it can be displayed to be viewed by an operator (e.g. firemen in case of a wildfire). Transmission of the situation awareness data can be executed by on-board command and control unit (e.g. with the help of communication module 21).

The situation awareness data which is displayed on a user device allows a human operator to monitor the ongoing event and determine based on the displayed data, how to deploy the UAVs. For example, in case of a wildfire, the displayed situation awareness data can include the SWIR camera images of the fire site, which may provide information indicating the perimeter of the fire site, the direction the fire is spreading, different areas catching fire within the fire site and so forth. The human operator can interact with the user device and provide data input including information indicative of a selected payload dispersion area i.e. an area within the event site where payload is to be dispersed.

To this end, the user device can include a user interface (including appropriate software and hardware) enabling the operator to input data. For example, the SWIR images can be displayed on a user device allowing the operator to mark with his finger (in case of a touch screen display) or a mouse a selected payload dispersion area. The user data input is transmitted back to command and control unit 52. Data input (including user input data and/or situation awareness data) is received by command and control unit 52.

At block 313 an initial planning process is executed. During the initial planning process user input data and/or situation awareness data are processed in order to determine a deployment scheme (defined by the deployment parameters) for deploying the UAVs for dispersing the payload over the payload dispersion area. At the end of the initial planning stage each UAV is assigned with a respective flight plan which includes a flight path directing the UAV to a designated payload dispersion point, were the payload material is to be dispersed by the UAV.

Figure 4:
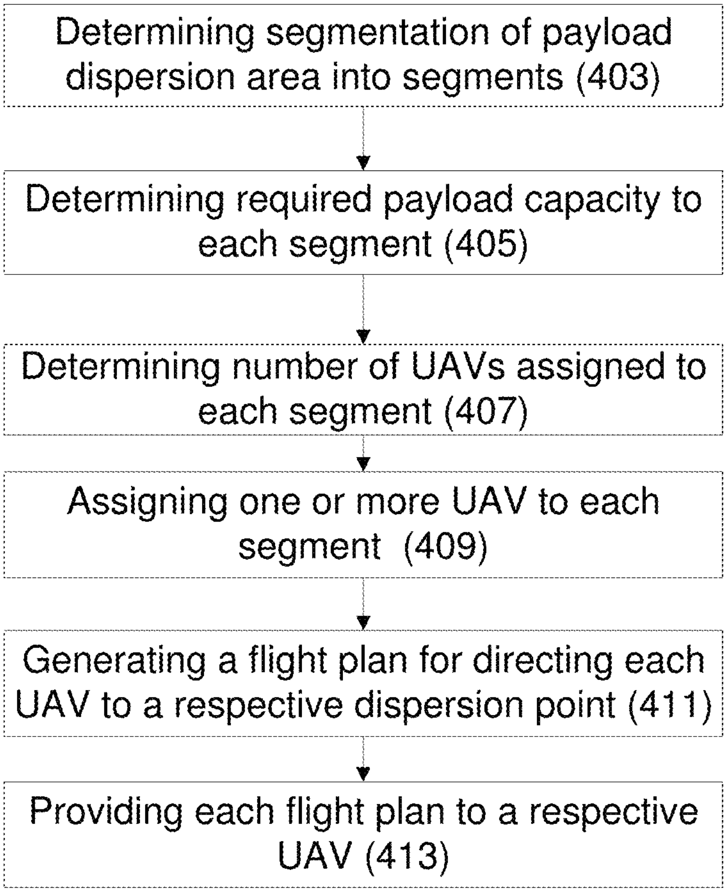
FIG. 4 is a flowchart illustrating operations carried out during initial planning, according to examples of the presently disclosed subject matter.

Turning to FIG. 4 it shows a flowchart of a sequence of operations carried out during the initial planning process, according to examples of the presently disclosed subject matter. Operations described with reference to FIG. 4 can be carried out for example, by on-board command and control unit 52 and more specifically by data input processing module 23 and initial planning module 25.

In general, in the following process UAV deployment parameters are determined. UAV deployment parameters include for example: the segmentation of the entire payload dispersion area, determination of the number of UAVs assigned to each segment, the generation of the flight plans assigned to each of the segments. The deployment scheme is defined by the deployment parameters.

Data input (including user input data and situation awareness data) received by command and control unit 52 is analyzed. As mentioned above, user input data includes data indicative of payload dispersion area. User data input may further include information characterizing the event. For example, in case of a wildfire user data input may also include information with respect to the type of fire (e.g. whether it is bush fire, surface and low tree fire, high tree fire) terrain type (e.g. whether the terrain is mainly flat landscape or hilly or mountainous landscape) and no flight zones.

According to one example, at block 403, command and control unit 52 is configured to divide the payload dispersion area into dispersion area segments (also referred to herein as “segments” in short). The payload dispersion area can be divided into segments of equal size or segments of varying sizes. According to another example, division into segments is provided as part of the user input data. A user interacting with user device 70 can mark on the displayed event picture, received from the data acquisition device, one or more segments in the dispersion area (e.g. by drawing polygons on the display at the desired locations within the dispersion area) towards which the UAVs are to be directed after deployment.

Notably, multiple clouds of UAVs can be deployed over a dispersion area, one after the other e.g. each cloud mounted and deployed from a different carrier aircraft. An operator of user device 70 can continuously monitor the event and can identify more or different segments as the event evolves. This updated input information is provided to onboard command and control unit 52 which directs the UAVs in the following UAV cloud according to the most updated input data received from the operator. For example, in case of a wildfire, the operator may identify locations in the dispersion area, previously untouched by the fire, where fire has started and select these locations as new area segments for payload dispersion in the upcoming UAV clouds.

Situation awareness data pertaining to each segment is analyzed in order to determine the required payload capacity for each segment (block 405). For example, in case of a wildfire, the amount of fire extinguishing payload (e.g. water) which is required in order to prevent further spreading of the fire in each segment is determined or estimated. This can be accomplished for example based on the fire intensity (e.g. measured in power per area units for example Watts per square meter) measured in each segment.

Next, the number of UAVs which are assigned to each segment (referred herein also as "UAV density") is determined (block 407). Payload distribution logic 31 includes the data logic needed for calculating the required number of UAVs for each segment. Payload distribution logic 31 can include for example, rules defining how the required payload capacity for each segment should be estimated. Knowing (or estimating) the amount of payload material needed for each segment and the amount of payload material carried by each UAV, the number of UAVs, which should be assigned to each segment, can be further determined based on payload distribution logic 31.

Continuing with the wildfire example, estimation of the required capacity depends on the intensity of the fire as well as a desired target intensity value which is required in order to avoid further spreading of the fire (due to for example, to unexpected re-ignition of the fire after being extinguished) where it is desired to bring the fire intensity down to the target intensity.

For example, input data can include information pertaining to fire type, fire load type (type of material (e.g. vegetation type) which is being consumed), wind intensity and direction, and characteristics of geographical terrain. This information is processed and the fire intensity is determined based on rules defined as part of the payload distribution logic.

The following is a non-limiting example of payload distribution logic which exemplifies the effect of various input data parameters on the fire intensity value.

Slope—payload distribution logic 31 defines the transition values from the terrain slope to a respective intensity values. For example, for any increase of 10 degrees in the slope of the event site terrain (obtained for example from a 3D map) the rate of fire expansion is considered to double and accordingly the fire intensity value is considered to increase (e.g. double or close to double) as well.

Fire load type—payload distribution logic 31 defines the transition values from the different types of material being consumed by the fire and respective intensity values. For example, conifer trees provide a considerably greater contribution to the fire intensity (say for example X2) values than eucalyptus trees (say for example X1.5).

Wind intensity—payload distribution logic 31 defines the transition values from the wind intensity (e.g. velocity) and respective intensity values.

According to one example, command and control unit 52 can be configured to operate data input processing module 23 to process the input data (including user input and data awareness data) and based on payload distribution logic 31 determine the number of UAVs which should be assigned to each segment.

An example of this type of calculation can be found in a paper entitled "Estimating the amount of water required to extinguish wildfires under different conditions and in various fuel types" to Rickard Hansen published online on Jun. 1, 2012, in International Journal of Wildfire Fire which is incorporated herein by reference in its entirety.

At block 409 UAVs are assigned to each segment according to the previous calculation. At block 411 a respective flight plan is generated for each of the assigned UAVs. Given the location of the segment assigned to a UAV and the expected dropping location of the UAVs (i.e. estimated location of dropping the UAVs from the carrier aircraft) a flight path directing the UAV from the expected dropping location to the location of the respective segment is generated. The flight path can include for example, a series of waypoints terminating at a dispersion point where the UAV is instructed to disperse its payload.

The expected deployment location can be directly above the event site or at some distance from the event site. In some cases it is preferable to deploy the UAVs at a safe distance from the event site in order to avoid damage or harm which may be caused to the carrier aircraft and/or aircrew. When using engineless gliders the exact distance of the deployment area from the event site can depend, inter alia, on the gliding ratio of the UAVs. A greater glide ratio allows deploying the UAVs at a greater distance from the event site. For example, a gliding ratio of 1:10 allows dropping the UAVs at a distance of 10 kilometers from the event site (assuming a dispersion height of 3300 feet).

Furthermore, an expected deployment location is selected to be at a safe distance from populated areas or other areas which may be damaged by the UAVs or by the payload material. Selection of the expected deployment location can be done by a human operator or autonomously by command and control unit 52.

It may be desired to coordinate between the flights of different UAVs assigned to the same segment. Coordination between UAVs all aiming to a nearby area is important in order to achieve efficient dispersion of payload material on the entire segment area and to avoid collision between UAVs.

According to one example of the presently disclosed subject matter, different UAVs, assigned to the same segment, are provided with a different arrival time (e.g. with a difference of a few seconds between arrival times) to their respective dispersion points. This can be accomplished for example, by adapting the range of the flight paths which are assigned to different UAVs. According to this approach, different UAVs fly from the dropping location to a respective dispersion point along respective flight paths, where each flight path spans a different distance. A more detailed example is described below with reference to FIG. 5.

In addition to the flight path, the flight plan can also include additional operational instructions. Additional operational instructions can be determined by onboard command and control unit 52 during flight planning. Payload distribution logic 31 can further include the logic needed for determining these additional operational instructions.

The additional operational instructions can include parameters characterizing payload dispersion by each UAV including for example one or more of: UAV flight velocity, UAV dispersion height, UAV angle of attack, and UAV rotating rate.

These dispersion parameters influence the effect of the dispersion of the payload material on the event environment and the determination of these parameters depends on the desired result and environmental conditions.

For example, the UAV angle of attack, which is defined by the pitch angle of the UAV during payload dispersion, affects the angle in which the payload is dispersed with respect to the terrain. Determination of the angle of attack can depend for example on the type of fire and the terrain characteristics.

In fires characterized by a high fire parameter (e.g. forest fire with tall tree canopy) the UAV will be directed to fly at a more vertical angle i.e. having a greater angle of attack.

In fires characterized by a low fire parameter (e.g. low bush fire) the UAV will be directed to fly at a more horizontal angle i.e. having a lower angle of attack.

In fires occurring on a landscape characterized by a steep slope (e.g. forest fire occurring on a steep hill or mountainside) the UAVs will be directed to fly at a more horizontal angle i.e. having a lower angle of attack. Also in fires occurring on a generally flat landscape (e.g. low bush fire) the UAVs will be directed to fly at a more horizontal angle i.e. having a lower angle of attack.

UAV rotating rate has an effect on the payload dispersion range and droplets density. The dispersion range increases with the rotation of the UAV around the turn axis and the density of the droplets decreases. Thus, these parameters are determined, depending on the desired dispersion rate and droplets density. UAV payload dispersion height is also determined according to a desired dispersion range and droplet density and is also dependent on the type of fire (e.g. in bush fire the dispersion height may be lower than in a forest fire with tall tree canopy).

Each flight plan is provided to a respective UAV (block 413). Notably, as the actual dropping location is not known at the time of initial planning and as it may be different than the expected dropping location, after deployment, updates to the flight plans (and specifically to the flight paths) may be required in order to adapt the flight plans to the actual dropping location.

Reverting to FIG. 3, the initial flight paths are distributed to the UAVs the UAVs are deployed into the sky at the actual deployment location (block 317).

According to one example, deployment of the UAVs can be done manually by an aircrew member. According to another example, deployment can include an automatic procedure activated in response to instructions, received for example from on-board command and control unit 52. The UAVs can be dropped from the carrier aircraft in various configurations. For example, UAVs can be dropped one at a time with a few seconds or milliseconds separating between each dropped UAV or in groups, each group comprising a number of UAVs, with a few seconds or milliseconds separating between each dropped group.

In some implementations, before deployment of the UAV cloud it is determined whether the payload dispersion area is clear from humans, animals or any other objects which may be harmed. As the maximal flight range of the UAVs is known (especially in case UAVs are engineless gliders which have a limited gliding distance) the hazard area below the UAV cloud deployment location can be determined. The dropping location can be changed in case it is determined that the current location is unsafe.

Following the deployment of the UAV cloud, the final planning procedure is executed (block 319). During final planning, in the event that the actual deployment location is different than the expected deployment location, the flight plans are updated. According to one example, during initial planning each UAV is assigned with a "draft flight plan" which is updated to become a "final flight plan" after deployment. Following the updates to the flight plan, the updates are transmitted to the UAVs (block 321) which at this point may have already started to proceed to their respective destinations according to the draft flight plans. Final planning procedure can be executed for example with the help of final planning module 27.

While UAVs are advancing towards their respective target dispersion areas on-board command and control unit 52 is configured to monitor the flight of different UAVs in the UAV cloud (block 323).

Monitoring of the air picture can be accomplished with the help of UAV flight monitoring and update module 29 configured to determine the flight progress of UAVs in the sky. Information regarding the flight progress can be obtained from each UAV (e.g. from UAV navigation module 116).

The real-time flight progress of a given UAV is compared to the respective flight path assigned to the UAV. If a deviation between the real-time flight progress and the respective flight plan is identified, flight instructions for re-directing the UAV to the correct flight plan can be generated autonomously by each UAV or by command and control unit 52 (block 325) and transmitted to the UAV (block 327). The flight instructions are transmitted to the UAV's flight control unit which is configured responsive to the received flight instruction to generate respective instructions to flight maneuvering devices (e.g. ailerons, winglets) for re-directing the UAV flight accordingly.

After a UAV reaches its respective dispersion point, payload dispersion is triggered causing payload dispersion system on-board the UAV to be activated and commence dispersion of the payload martial. Activation of the payload dispersion system can be triggered responsive to the determination that one or more predefined conditions have been met. For example, activation can be location based—where activation occurs when the UAV reaches a certain predefined location (possibly also a dispersion height provided with the flight plan). This can be accomplished for example, by flight computer 110 which can be configured to receive positioning information from UAV positioning devices, determine when a dispersion point, assigned to the UAV in the flight plan, has been reached, and send instructions to activate the dispersion system if it has.

Another condition can be detection of an abrupt temperature gradient. This can be determined for example, by flight computer 110 which can be configured to receive current temperature from an on-board temperature sensor, identify an abrupt temperature gradient and send instructions to activate the dispersion system if it has.

As mentioned above, UAVs can be engineless gliders made of consumable and/or biodegradable material. In such case, the UAVs can be made as disposable UAVs assigned with "Kamikaze" flight paths directing the UAV to disperse the material while flying toward the ground and finally landing or crashing. This can be advantageous, for example, where it is desired to disperse the payload from a close distance from the hazardous element (e.g. dispersion of water close to the fire source).

Figure 5:
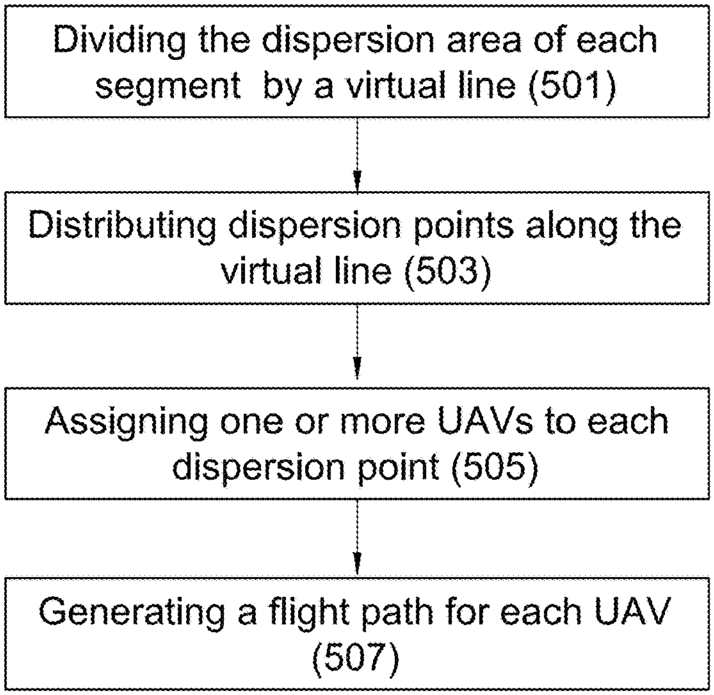
FIG. 5 a flowchart illustrating operations carried out during initial planning and UAV deployment, according to examples of the presently disclosed subject matter.
Figure 6:
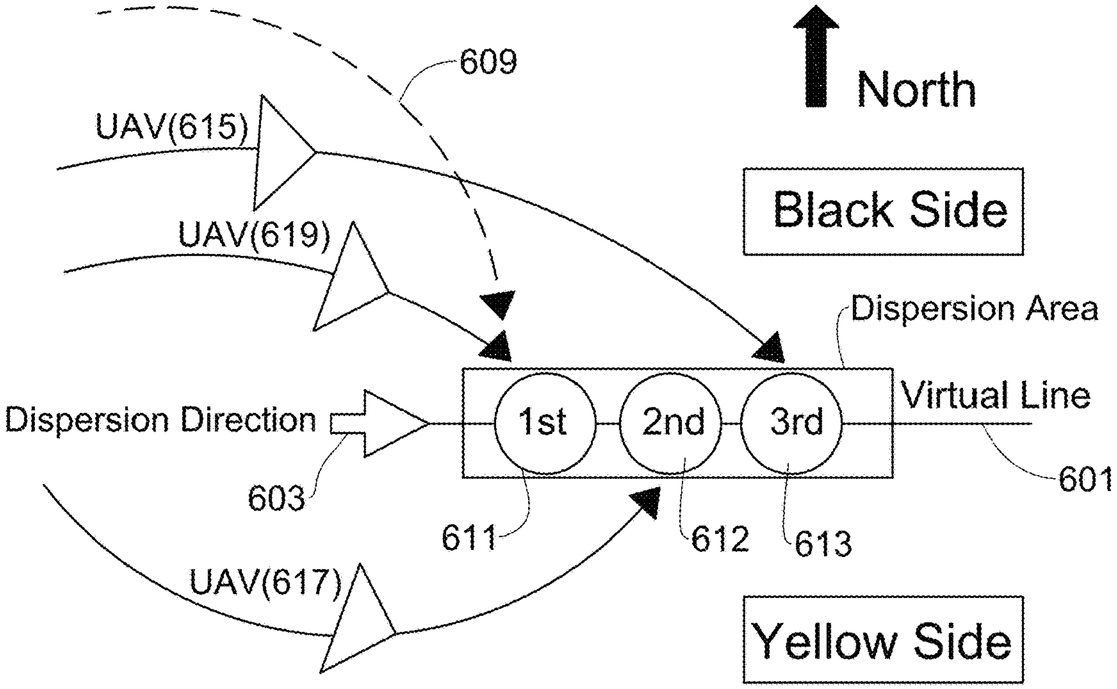
FIG. 6 is a schematic illustration of a dispersion area from top view, demonstrating some principles disclosed herein with reference to FIG. 5.

Turning to FIG. 5 it shows a flowchart of operations carried out during initial planning, according to examples of the presently disclosed subject matter. Operations described with reference to FIG. 5 can be executed for example as part of the flight plan determination process (see for example block 411 in FIG. 4 described above). Operations described with reference to FIG. 5 can be executed for example by on-board command and control unit 52 (e.g. with the help of initial planning module 25). FIG. 6 is a schematic illustration of a dispersion area from top view, demonstrating some principles disclosed herein with reference to FIG. 5.

As explained above, according to some examples, one or more UAVs are assigned to each segment and each of the assigned UAVs is provided with a flight plan for directing the UAV to a respective dispersion point in the assigned segment.

According to one example, the following procedure is carried out in order to improve efficiency of the payload dispersion and coordinate the dispersion of the payload material by the different UAVs. Coordination of the dispersion allows timing the dispersion of payload by each UAV and thereby obtaining a desired segregating and/or synchronization between the dispersion time of payload by different UAVs assigned to the same segment.

At block 501 the dispersion area of a specific segment (referred to herein as "segment-specific dispersion area") is virtually divided by a virtual line crossing the segment-specific dispersion area in the direction of the UAV flight. In some cases, the virtual line is positioned substantially in the center of the segment-specific dispersion area; however this is not always necessary. Virtual line 601 in FIG. 6 divides dispersion area 600 into two parts denoted for simplicity as North side and South side. Notably, arrow 603 on virtual line 601 indicates the dispersion direction i.e. UAVs are approaching the segment-specific dispersion area in the direction of arrow 603 (from West to East).

At block 503 dispersion points are distributed along the virtual line. The number of dispersion points distributed along the virtual line and the distance between two consecutive dispersion points depends, inter alia, on the total number of UAVs assigned to the segment and to the length of the virtual line (which depends also on the dimensions of the segment-specific dispersion area surface). FIG. 6 shows an example of three dispersion points (612, 611, and 613) distributed along virtual line 601. The distribution of dispersion points along a virtual line enables to control the total density of the dispersed payload material. Given the dispersion radius of each UAV an overlap ratio between consecutive UAVs can be determined (e.g. tangent dispersion radiuses have zero overlap ratio). The greater is the overlap, the greater is the density.

At block 505 each dispersion point is assigned with one or more UAVs from among the UAVs in the UAV cloud. For example, if a group of UAVs have already been assigned to the segment, at least one UAV in the group is assigned to each dispersion point.

At block 507 a flight plan is generated and assigned to each UAV, wherein the flight plan includes a flight path directing the UAV from the required dropping location to a respective dispersion point assigned to the UAV. As illustrated in FIG. 6 the respective flight paths of UAVs assigned to consecutive dispersion points alternate between the north side and south side. For example, UAV 615 assigned to dispersion point 611 is directed to fly from the north side, UAV 617 assigned to next dispersion point 612 is directed to fly from the south side, and UAV 619 assigned to the third dispersion point 613 is directed to fly again from the north side and so forth. This mechanism allows coordinating the payload dispersion while reducing the risk of collision.

Furthermore, as mentioned above the range of each flight path can be adapted in order to control the timing of the payload dispersion. Different UAVs can be assigned with flight paths of different range in order to create a time separation between dispersion of the payload by each UAV.

According to one example the duration between the dispersion times at each dispersion point in a given segment-specific dispersion area is a constant value (e.g. predetermined as part of the payload distribution logic 31). In order to maintain the required duration between dispersion times, different UAVs assigned with consecutive dispersion points are provided with specifically selected flight paths and velocity which enables to time the dispersion at each dispersion point according to the requested timing difference.

For example, two UAVs which are assigned with consecutive dispersion points can be each given a flight path of the same range (or different velocity) in order to synchronize the dispersion time of the two UAVs. For example, the range of flight plan assigned to UAV 615 can be adapted to have the same range as the flight path of UAV 617 (characterized by a larger turn—see broken line 609) which is located further away from the dropping point. By providing flight paths of equal range and velocity the payload material dispersion of UAV 615 is synchronized with that of UAV 617.

In another example, two UAVs, which are assigned to the same dispersion point can be each given a flight path of different range (and/or different velocity), thereby creating a difference between the payload dispersion time of each of the UAVs at their common dispersion point. The range (and/or velocity) of each flight path can be selected based on the requested timing as defined in the payload distribution logic.

Coordinating the dispersion time of different UAVs all assigned to the same segment by assigning flight paths with a different range to different UAV enables to control the payload dispersion time of engineless UAVs (e.g. gliders) which have limited control on the UAV speed. As the maximal flight range of the UAVs (e.g. engineless glider) can be known or estimated, this information can be used for calculating a route within the gliding constraints of the UAV which would bring the UAV to its dispersion point at the desired time.

Furthermore, Coordinating the dispersion time of different UAVs all assigned to the same segment enables to maintain a continuous and homogenous payload dispersion (e.g. homogenous flux of payload of the event area; flux being the rate of flow) over the event area and thereby increase the efficiency of the desired effect of the payload material. The coordination can be also implemented between consecutive clouds of UAVs (e.g. each cloud deployed by a different carrier aircraft).

During operational events it is often desirable to monitor the situation awareness data (SAD) pertaining to the event conditions. For example, situation awareness data may be needed to determine the rate and direction of spreading of a wildfire or a cloud of noxious gas. Furthermore, it may also be desirable to monitor the effect of the dispersion of the payload over the event site. For example, in a wildfire event it may be desired to determine whether dispersion of fire extinguishing material over a wildfire has helped in quenching the fire and is reducing the rate of fire spreading. Or in a gas spill event, it may be desired to determine whether dispersion of gas absorbing or disintegrating material dispersed in the gas spill area has helped in reducing the concentration of gas particles in the air.

Although as explained above situation awareness data of this kind can be obtained by data acquisition device installed onboard a carrier aircraft (e.g. SWIR camera), a data acquisition device onboard the aircraft views the event site from the safe distance of the carrier aircraft and can therefore provide real-time information which is limited by this distance.

As described above UAVs carrying payload material are directed to disperse the material over a designated dispersion area segments while flying toward the surface of an event site in order to deliver the payload from a close distance. According to some examples, UAVs can be engineless gliders made of consumable and/or biodegradable material. The UAVs can be made as disposable UAVs assigned with "Kamikaze" flight paths directing the UAV to disperse the material while flying toward the ground and finally landing or crashing. This can be advantageous, for example, where it is desired to disperse the payload from a close distance from the hazardous element (e.g. dispersion of water close to the fire source).

The presently disclosed subject matter further teaches to use the UAVs for collecting situation awareness data from the event site and to use the collected SAD for monitoring the event. Furthermore, the collected situation awareness data can be used for assessing the effect of the dispersed payload material on the event. For example, in case of a wildfire event, the collected data can be analyzed to determine whether the dispersed payload has succeeded in reducing the flames and containing the fire. Likewise, in a gas spill event, the collected data can be analyzed to determine whether the dispersed payload has succeeded in reducing the concentration of gas particles in the air, or, in a cloud seeding mission, sensed data can be used for determining whether a cloud seeding is successful or not.

As described above, UAVs can be equipped with various sensors (Sensors 122 in FIG. 2*a*) configured for collecting different types of situation awareness data. In addition to temperature (heat) sensors mentioned earlier, UAVs can carry various other sensor such as: humidity sensors for determining humidity; various types of image sensors; chemical sensors configured for sensing chemical substances in the air; sensors for measuring wind intensity and direction; and others.

According to one example, on-board computer 110 (installed on the UAVs) can be configured to receive the sensed data from the sensors and transmit the data (e.g. via communication module 112) to on-board command and control unit 52 where the information is analyzed to determine real-time situation awareness data. Command and control unit 52 can comprise for example, situation awareness data (SAD) processing unit 35 configured to analyze the received SAD and provide output pertaining to real-time conditions of the event. In other examples, processing of the sensed data can be done by one or more other computerized devices (e.g. user device 70 and/or database 1000 described below).

Figure 9:
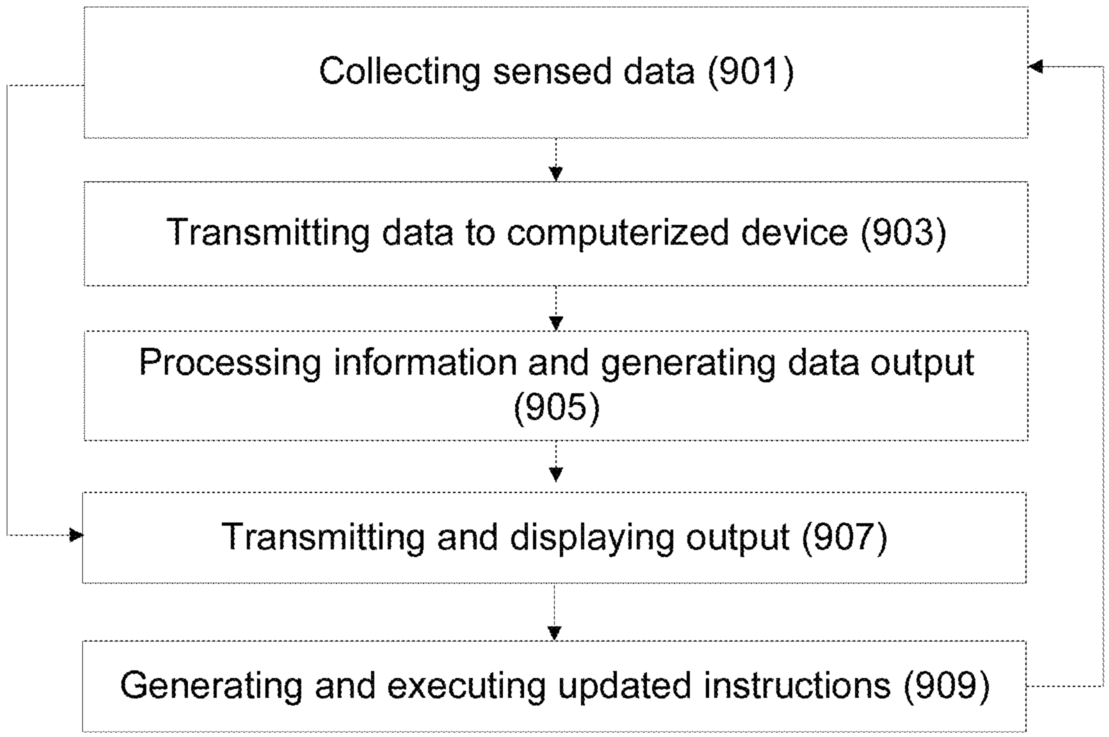
FIG. 9 is a flowchart illustrating operations carried out for real-time monitoring and data analysis, according to examples of the presently disclosed subject matter.

FIG. 9 is a flowchart illustrating operations carried out for real-time monitoring and data analysis, according to examples of the presently disclosed subject matter.

At block 901 sensed data is collected by one or more sensors on-board the UAVs. While the UAVs are flying towards their respective designated dispersion points, sensors on-board the UAVs can be used for collecting information from the surroundings of the event site. All or part the deployed UAVs can be configured to use sensors for collecting information, which can then be transmitted to C&C unit 52 or some other computerized device (block 903). Additionally or alternatively, sensed data can be transmitted to user device 70 and displayed on a display screen to be viewed by an operator. Communication module 112 on-board the UAVs can be used for transmitting sensed data from the UAV to other computerized devices.

Collection and transmission of sensed data can continue as a UAV participating in a payload dispersion mission, which flies around the event site and advances closer towards the event site. This allows obtaining situation awareness data from as close as possible to the event site. In those cases where the UAVs are directed to crash on the event site surface or be destroyed by the environmental conditions (e.g. burnt in a fire) collection and transmission of sensed data can continue until the onboard system become inoperable.

At block 905 sensed data is received and processed for generating output including real-time SAD and performance feedback. Real-time SAD includes information pertaining to real-time parameters measured at the surroundings of the event site, including for example, measured temperature, measured humidity, measured wind velocity and direction, etc.

Performance feedback includes information pertaining to changes in the real-time measurements over time. Changes in the measured parameters can be indicative of the effect of the dispersed payload material on the event site and can be used for determining whether the current payload dispersion setup is satisfactory or whether it should be updated.

For example C&C unit 52 can receive from one or more UAVs, a first sensed data detected by one or more respective sensors onboard the UAVs, and compare this data with a second sensed data, which is detected at a different (e.g. earlier) time by sensors onboard the same or by one or more other UAVs which are currently flying (or previously flew) over the same dispersion area (e.g. the same specific area segment). Assuming payload has been dispersed over the dispersion area sometime between the detection of the first sensed data and the detection the second sensed data, the measured difference between the values of the sensed data can be indicative of the effect of the payload material on the event.

For instance, in a wildfire event temperature measurements (received from heat sensors on-board the UAVs) taken over time as payload, being dispersed over a certain area (e.g. specific segment) can be indicative of the effect the dispersed material has on the fire. Reduction in measured temperature over time and specifically reduction in temperature measurement which correlates with payload dispersion, can indicate that the payload has a positive effect on the event. On the other hand, if no reduction, or insufficient reduction in temperature is detected, this may indicate that more or different payload should be delivered in order to obtain better results.

According to another example, images (captured by cameras onboard the UAV) can be analyzed using image processing for determining whether the perimeter of burning areas has diminished in size or not. Images taken before and after dispersion of payload can be compared to determine whether favorable changes in the perimeter can be detected and accordingly determine whether (and what type of changes) should be made to the payload dispersion setup.

In a further example, in a cloud seeding application, sensed data can be used to determine whether a relevant parameter (e.g. concentration of water in the cloud and the area below it) show successful seeding, and if not this may indicate that an alternative seeding location should be selected.

Information received from a specific UAV can be processed individually e.g. in order to analyze the performance of the specific UAV. In addition, information received from a plurality of UAVs can be consolidated and processed together in order to analyze the overall performance of part or all of the UAV cloud.

According to some examples, information collected from multiple UAVs flying over the event site can be consolidated and used for calculating an integrative value. As mentioned above, in some examples, the event site includes a dispersion area comprising one or more segments and wherein one or more UAVs are assigned to disperse payload over a specific area segment (e.g. based on the required payload capacity). Sensed data obtained from sensors on-board multiple UAVs all assigned to the same or nearby area segments can be collected and processed together to provide combined real-time SAD and/or performance feedback pertaining to the relevant segment(s).

For example, sensed data from multiple UAVs can be used for calculating an integrative (e.g. average) value indicative of the collective effect of the payload which was dispersed by all UAVs assigned to the same segment. Or in another example, images captured by multiple cameras on-board different UAVs can be processed to generate a larger image covering a larger part of the event area.

Command and control unit 52 can be configured to operate SAD processing module 35 to process the collected information and generate output including real-time SAD and performance feedback. Instructions for updating the deployment parameters can be generated based on the real-time SAD and/or performance feedback. Updates to the deployment parameters can include for example, changing the number of UAVs assigned to a given segment; changing the rate of UAV deployment; selecting an alternative seeding location; changing the density of the dispersed payload; changing the size of payload droplets, etc.

According to one example, the generated output can be transmitted to user device 70 to be displayed and viewed by an operator (block 907). The operator can monitor the event and determine, based on the displayed information, whether the operations of the UAVs are effective or not. The operator can respond to the displayed information and generate instructions for updating the deployment parameters accordingly. For example, the operator can generate instructions for increasing the number of UAVs assigned to a given segment and/or the rate of UAV deployment and/or density of the dispersed payload and/or size of payload droplets, etc.

According to another example, SAD processing module 35 can be configured to autonomously generate, based on the real-time SAD and performance feedback, instructions to update deployment parameters. For example, payload dispersion logic 31 can include rules for updating the number of UAVs assigned to a given segment in case the result obtained by the current number of UAVs is insufficient. For example, following the calculation of the required payload capacity for each segment described above with reference to FIG. 4, the calculated capacity can be updated based on the calculated performance feedback value. For instance, if the reduction in measured temperature is less than a given value, SAD processing module 35 can generate instructions to increase the capacity (and accordingly the number of UAVs) by a certain percentage of the initially determined capacity value.

Update instructions can be provided before deployment of subsequent UAVs. For example, the process of determining payload capacity for each segment described above with reference to FIG. 4 can be updated according to the obtained situation awareness data and accordingly more or less UAVs may be assigned to each segment. Alternatively or additionally, update instructions can be provided to UAVs already in operation above the event site. For example, instructions can be generated to remotely control a payload dispersion nozzle for updating the droplet size or droplets density.

According to some examples, in case UAVs on-board systems become inoperable before the UAV is able to get close to the heart (or source) of the event, measurements which are obtained until the UAV becomes incapacitated can be processed for deducing information pertaining to the areas located closer to the event source. For example, in a canopy fire, where the canopy of the trees is burning, UAVs may be destroyed before they can fly close to the trees. In such cases the estimated temperature at other parts of the fire located closer to the trees can be calculated (e.g. by SAD processing module 35) using models which are known per se and are based on information including: the temperature measured by the UAVs, the type of event (type of fire), the type of trees and other information (e.g. wind direction and velocity) and so forth.

As the payload dispersion mission progresses, the process described with reference to blocks 901-909 can be repeated in order to continuously determine whether updates should be made to the deployment parameters.

In addition to the above, it is further disclosed to use the collected sensed data for predicting event progress (e.g. prediction of future event conditions such as direction of future spreading (e.g. spreading direction and speed) of fire, direction of future spreading of hazardous material, etc.). As explained above sensed data can be collected very close to or from within the event site (e.g. close to burning material or within a cloud of hazardous material). Due to the continues flow of UAVs passing into the mission area (and specifically to their assigned area segments) the sensed data can be collected within very short time intervals, providing accurate and continues information (real-time SAD) from the event site. For example, sensed data (including for example parameters such as temperature, wind velocity, wind intensity, concentration of hazardous material, etc.) can be continuously collected (for a given area—providing flux) with seconds or minutes separating between sampling. Such high frequency (or high flux) sensing provides a high resolution real-time picture of the event progress.

The collected sensed can be used for accurate prediction of the event progress in the near future. For example, the collected sensed data can be used for anticipating changes in the spreading of wild fire in the next few seconds or few minutes. This can be accomplished for example, by various mathematical models, which are known in the art, and can be used for predicting changes in events such as the predicted spreading of a wild fire (which can be predicted according to some models based on the wind velocity, wind intensity and the characteristics of the terrain).

The continues flow of UAVs and their close proximity to the event site enables to obtain high frequency (or more specifically high flux) data sensing from the event site. This information can be used for predicting changes in the event progress in the near future (e.g. next few seconds or next few minutes; referred herein in general as "immediate future").

The time period of the immediate future is related to the frequency (or more specifically the flux) of the sensing/sampling of the data. A greater sensing/sampling flux enables to predict future event conditions to a shorter future time period (i.e. "a closer immediate future"). This is so because a higher sampling frequency (or flux) provide sufficient data for making an accurate prediction over a short time. For example, according to some examples immediate predictions can be made anywhere between the next 1 to 400 seconds. In some examples, predictions can be made anywhere between 5 second to 120 seconds.

The immediate and continuous availability of additional UAVs as well as the controllability over deployed UAVs (e.g. travelling on their way to an assigned area segment) as well as over the immediate deployment of additional UAVs (e.g. currently onboard a carrier aircraft) enables a response time within the prediction time frame of the immediate future.

For example, assuming that it is anticipated that the wild fire is about to spread towards a certain area in the next few seconds, a cloud of UAVs which has just been deployed can be directed to the anticipated spreading area of the fire before the fire reaches the area in order to disperse the payload and prevent the fire from spreading.

Thus, according to some examples, command and control unit 52 can be configured to operate SAD processing module 35 to process the collected information (using for example appropriate mathematical models) and generate output including prediction of the event process. Instructions for appropriated (new or updated) deployment parameters can be generated based on the predicted event process. Updates to the deployment parameters can include for example, changing the number of UAVs assigned to a given segment; changing the rate of UAV deployment; selecting an alternative seeding location; changing the density of the dispersed payload; changing the size of payload droplets, directing the UAVs to an estimated future spreading area of the event, etc. As explained above, instructions for updating the deployment parameter can be generated by an operator or autonomously by SAD processing module 35 based on payload dispersion logic 31.

The presently disclosed subject matter further contemplates a database system (e.g. data warehouse system) for storing and analyzing information (mission data) obtained during many operational events of various types. The stored information can be used for creating an organized data resource which can be used for identifying correlations between various parameters and for using the identified correlations for enhancing payload distribution logic.

As explained below, the database system can operate as a data resource and processing entity which enables to constantly improve and update the deployment parameters of an ongoing payload dispersion mission in real-time. In addition, enrichment of the database helps to improve and update the mission execution recommendation for providing better results in future payload dispersion missions.

Figure 10:
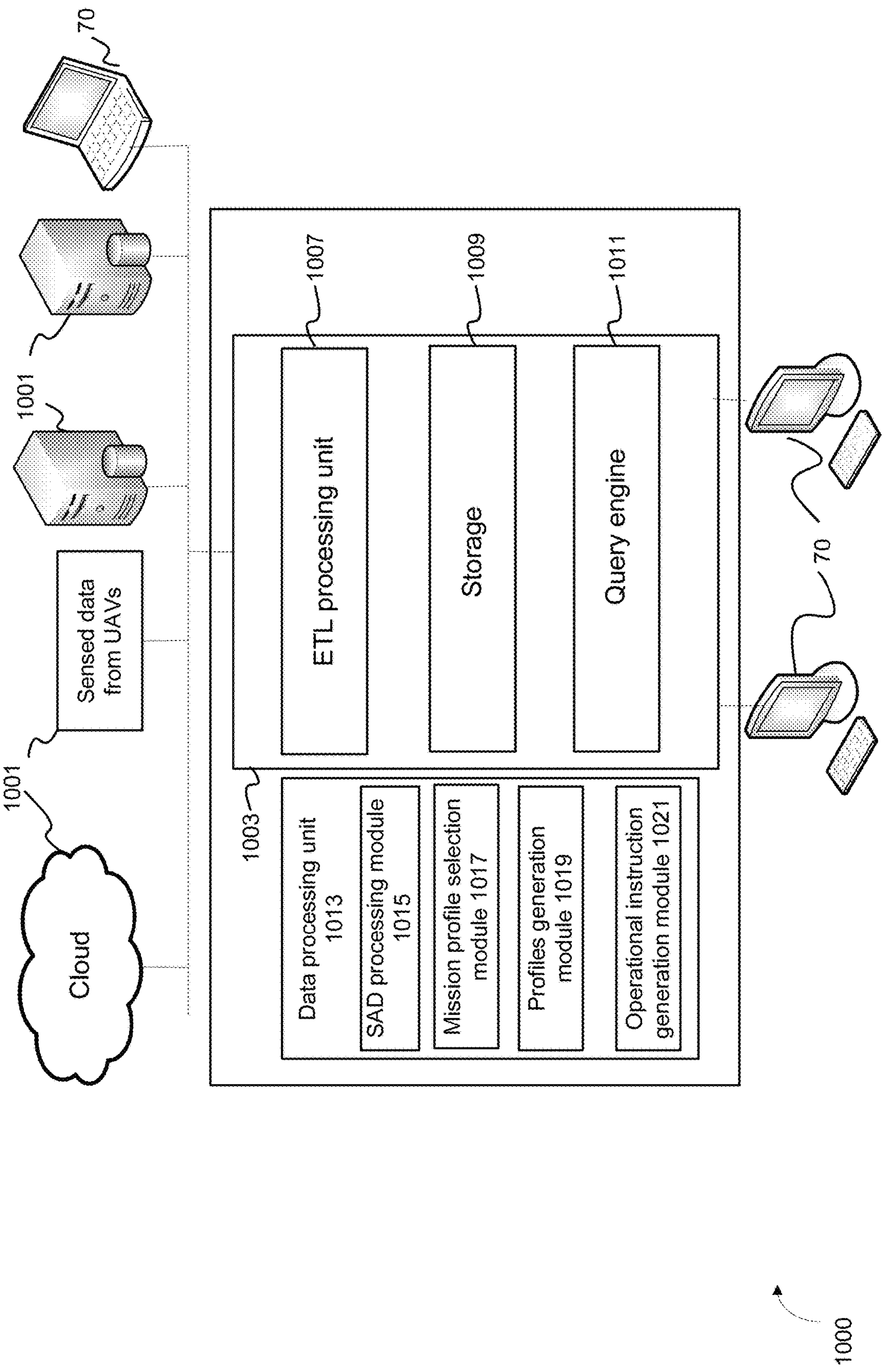
FIG. 10 is functional block diagram of a database management system according to examples of the presently disclosed subject matter.
Figure 11:
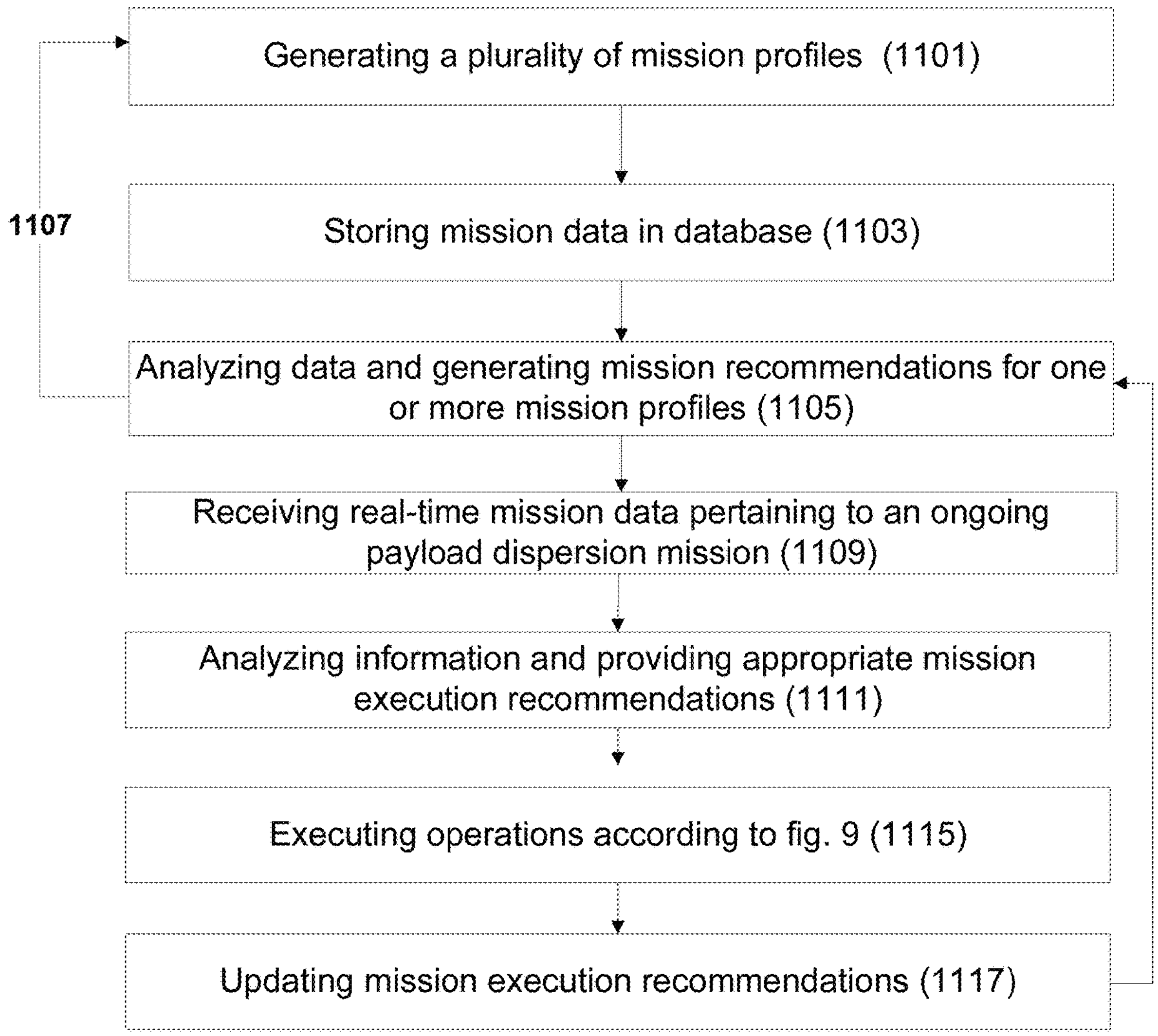
FIG. 11 is a flowchart illustrating operation carried out according to examples of the presently disclosed subject matter.

FIG. 11 is a flowchart illustrating operations carried out according to examples of the presently disclosed subject matter. Operations described with reference to FIG. 11 can be executed for example by a system illustrated in FIG. 10 which is described further below.

FIG. 10 is a functional block diagram schematically illustrating a database management system 1000, according to some examples of the presently disclosed subject matter. Database system 1000 (e.g. data warehouse system) is a computer system comprising one or more computerized devices. The process of collecting and storing the data in a database is commonly known as an extract, transform, load process (ETL). Database system 1000 can comprise for example a data warehouse processing layer 1003 which comprises in turn, ETL processing unit 1007, data storage unit 1009 and query engine 1011. ETL processing unit 1007 is configured, responsive to received instructions, to import data from various data sources 1001.

According to one example, following an import command, ETL processing unit 1007 is configured to execute ETL operations including data extraction, data transformation and data loading. Data stored in the database can be obtained from various data sources 1001 including for example, ground and onboard C&C unit, user device 70, deployed UAVs, other databases storing data pertaining to past operational events, external sources (e.g. meteorological centers), etc.

Many different payload dispersion systems operating at different geographical locations possibly at different times can be connected over a communication network to database system 1000 to enable collection and storage of mission data in the database system. For example, communication network 80 (described above with reference to FIG. 1) connecting the different entities in each payload dispersion system 100 (including UAVs, user devices and C&C units) can be further connected to the database system (e.g. over the Internet) and transmit mission data generated during payload dispersion missions to the database system.

The database system further includes a query engine and a user interface for enabling a user to access the database and execute queries on the stored data. According to some examples, as described below a user can input to query engine (via the user interface) information describing an operational event. The query engine can be configured to search in the database and provide recommended deployment parameters. Optionally, the user interface can be available on user device 70, enabling an operator (e.g. fireman) to interact with and obtain information from the database.

Database system 1000 can further comprise data processing unit 1013 (comprising or otherwise operatively connected to a computer processor and computer memory) configured to process stored data as described herein with reference to FIG. 11.

Each type of event (e.g. wildfire, oil spills, biological hazard spill, chemical hazard spill, cloud seeding, etc.) can be characterized by a set of parameters which define the event. For example in a wildfire event these parameters can include: fire type, wind intensity, fire load type, terrain type, and humidity. Each one of these parameters can be assigned with one of a plurality of possible values. In some case, the assigned values are a set of discrete values (e.g. different fire types, different fire load types, preset wind intensity values (e.g. intense wind, strong wind, medium wind, low wind, no wind)) and so forth).

Thus, in some examples different mission profiles are generated for each type of event (block 1101). Each mission profile representing a distinguishable operational event scenario which is defined (in addition to the mission type) by specific parameters and specific collection of values which are assigned to the parameters. For example, in case there are 5 different parameters and 5 different values which can be assigned to each parameter, there are $5^5$ different possible profiles. As explained above, the values which are assigned to the parameters of each mission profiles can be obtained from user input and from collected situation awareness data. Mission profiles can be generated for example by data processing unit 1013 e.g. with the help of profiles generation module 1019.

For different types of events, information recorded in real-time during the execution of different payload dispersion missions (also referred to herein collectively as "mission data") is continuously stored in the database system (block 1103). Mission data which can be stored in the database includes but is not limited to: user input data provided during payload dispersion missions, situation awareness data collected during payload dispersion missions (including sensed data obtained from sensors onboard participating UAVs), and deployment parameters.

The mission data (and specifically the parameters values) can be used for associating a given event with an appropriate mission profile. For example, user input received during a given wildfire event can include the information indicating which of the mission profiles most accurately represents the wildfire event. Sensed data (including the data collected by different sensors on-board UAVs participating in payload dispersion missions with the specific mission profile) and deployment parameters (including the deployment parameters used during missions with the specific mission profile) can be stored in the database and be linked to the appropriate mission profile.

Mission data stored in the database can be recorded over a long period of time during the execution of many payload dispersion missions. Sensed data in the stored mission profiles can therefore include data obtained from a large number of UAVs participating in the different payload dispersion missions. Likewise, deployment parameters can include data obtained from many different missions.

Database system is configured to analyze the data (e.g. by SAD processing module 1015 in data processing unit 1013) accumulated over time and generate for each mission profile one or more mission execution recommendations to be used during a real-time payload dispersion mission (block 1105). The mission execution recommendations are based on the operational experience which is obtained over time. Data analysis can include various data analytics methods and algorithms. For example, various statistical methods can be used for determining which deployment parameters provided the best results (e.g. fastest fire extinguishing). The processing executed by database system can also include similar processing to that which is explained above with reference to block 905. Mission execution recommendations can be stored in database system 1000 in association with an appropriate mission profile.

The collection, storage and analysis of data are executed during (and following) many payload dispersion missions and accordingly the amount and quality of the stored data is continuously increased (arrow 1107).

During real-time, mission data input pertaining to the specific ongoing event can be provided to database system 1000 (e.g. via query engine 1011). For example, during an ongoing event an operator can interact with user device 70, and input data comprising parameters values pertaining to the ongoing event (e.g. in a wildfire event the values can pertain to fire type, wind intensity, fire load type, terrain type, and humidity).

The input data is analyzed and an appropriate mission profile is accordingly selected from the profiles available in the database (e.g. by mission profile selection module 1017 in data processing unit 1013). The selected mission profile comprises mission execution recommendations which comprise the recommended deployment parameters to be used during the payload dispersion (block 1111). According to some examples mission execution recommendations can further comprise operational instructions for controlling the UAVs during execution of the payload dispersion mission. In other examples, operational instructions for controlling the UAVs during execution of the payload dispersion mission can be generated in real-time based on the mission execution recommendations (block 1113).

According to one example, operational instructions generation module 1021 in processing unit 1013 can be configured to generate the operational instructions and send them to C&C 52 to be forwarded to the UAVs. According to another example, the mission execution recommendations can be sent to C&C 52 which is configured in turn to generate the operational instructions accordingly and forward them to the UAVs.

In addition, as explained above, during execution of payload dispersion mission, situation awareness data including sensed data which is obtained directly by the UAVs in real-time, is collected and analyzed. The SAD collected in real-time can include for example: wind intensity, wind direction, temperature, relative humidity, type and relative percentage of chemical substance composition detected in the event area.

In addition to enriching the database, the SAD collected in real-time can be analyzed for generating performance feedback with respect to the specific payload dispersion mission, and for updating the deployment parameters if necessary, as described with reference to FIG. 9 above (block 1115). Furthermore, updates made to missions in real-time can be used for updating mission execution recommendations of one or more mission profiles to provide better recommendations to be used in future missions (block 1117). Operations described with reference to block 1115 and 1117 can be executed for example by SAD processing module 1015 in data processing unit 1013.

It is to be understood that the command and control system according to the presently disclosed subject matter may be a suitably programmed computer. Likewise, the presently disclosed subject matter contemplates a computer program being readable by a computer for executing method steps according to the presently disclosed subject matter. The presently disclosed subject matter further contemplates a machine-readable non-transitory memory tangibly embodying a program of instructions executable by the machine for executing method steps according to the presently disclosed subject matter.

It is also to be understood that the presently disclosed subject matter is not limited in its application to the details set forth in the description contained herein or illustrated in the drawings. The presently disclosed subject matter is capable of other embodiments and of being practiced and carried out in various ways. Hence, it is to be understood that the phraseology and terminology employed herein are for the purpose of description and should not be regarded as limiting. As such, those skilled in the art will appreciate that the conception upon which this disclosure is based may readily be utilized as a basis for designing other structures, methods, and systems for carrying out the several purposes of the present presently disclosed subject matter.

Those skilled in the art to which this invention pertains will readily appreciate that numerous changes, variations, and modifications can be made without departing from the scope of the invention, mutatis mutandis.

The invention claimed is:

1. A system for deploying a plurality of unmanned aerial vehicles (UAVs) by an airborne carrier aircraft for dispersing payload material, each of the plurality of UAVs including at least one container containing payload material and being configured to disperse the payload material at a designated dispersion area in an event site, the system comprising:

a computerized command and control unit mountable on-board the airborne carrier aircraft and operatively connected to a data acquisition device, the command and control unit being configured to:

operate the data acquisition device for obtaining situation awareness data from the event site;

transmit the situation awareness data to a user device and receive user data input from the user device, wherein the user input data includes information of a selected payload dispersion area, wherein the payload dispersion area includes a plurality of area segments each of which is assigned with a respective payload dispersion area;

assign one or more UAVs from the plurality of UAVs to each of the plurality of area segments, to estimate, based on the situation awareness data and/or the user data input, a total amount of payload required in each given area segment of the plurality of area segments;

process the situation awareness data and/or the user data input to: determine a required payload capacity for each of the plurality of area segments; wherein payload capacity of each given area segment from the plurality of area segments is determined based on situation awareness data characterizing the respective payload dispersion area of the given area segment;

determine a number of the plurality of UAVs assigned to a given segment of the plurality of segments, based on an amount of payload carried by each of the plurality of UAVs;

assign one or more UAVs from the plurality of UAVs to each of the plurality of area segments, based on the required payload capacity; and generate for each of the plurality of UAVs a respective flight plan including a flight path for directing the UAV from an expected dropping point location to a dispersion point.

2. The system of claim 1, further comprising the plurality of UAVs, where each of the plurality of UAVs is configured, upon dropping thereof from the airborne carrier aircraft when airborne, to: autonomously operate a flight control unit for directing flight according to a respective flight path to a respective dispersion point and operate a payload dispersion unit for dispersion the payload at the dispersion point.

3. The system of claim 1, further comprising a communication unit being operatively connected to the command and control unit and configured to transmit and receive data over a communication network.

4. The system of claim 1, wherein the command and control unit is configured, following dropping of the plurality of UAVs from the airborne carrier aircraft, to update respective flight paths according to an actual dropping location and transmit flight path updates to the plurality of UAVs.

5. The system of claim 1, wherein the command and control unit is configured, following dropping of the plurality of UAVs from the airborne carrier aircraft, to monitor flight progress of at least one UAV of the plurality of UAVs and transmit to the at least one UAV flight instructions for operating a flight control unit on-board the UAV for directing the UAV to proceed to a respective dispersion point, in case a deviation from the respective flight plan is detected.

6. The system of claim 1, wherein the user data input includes one or more of: wind direction; direction of dispersion; no-flight zones; wind intensity; terrain type, fire type, fire type load, or no-flight zones.

7. The system of claim 1, wherein the flight plan includes information pertaining to: UAV rotating rate during dispersion, required payload dispersion height, and UAV angle of attack during dispersion.

8. The system of claim 1, wherein the command and control unit is configured for coordinating the time of payload dispersion of a first a UAV of the plurality of UAVs and a second UAV of the plurality of UAVs from among the plurality of UAVs assigned to the same area segment of the plurality of area segments; to:

determine a respective dispersion time for each one of the first UAV and the second UAV; and determine a respective flight path for each one of the first UAV and the second UAV, each respective flight path is characterized by a range selected to bring the respective UAV to a respective dispersion point at the respective time.

9. The system of claim 1, wherein the system is configured for being operatively connected to a ground command and control unit connected to a plurality of UAVs stored in a storage and maintenance facility and is configured to routinely activate a maintenance check for determining operability of the plurality of UAVs.

10. The system of claim 1, wherein the event site includes at least one of:

oil spill, cloud seeding, biological hazard spill, chemical hazard spill, or wildfire, pesticides.

11. The system of claim 1, wherein at least one of the plurality of UAVs includes an engineless glider, which is optionally made of consumable and/or biodegradable material.

12. A method of deploying a cloud of unmanned aerial vehicles (UAVs) for dispersing payload material thereby, by an airborne carrier aircraft configured to carry and deploy a plurality of UAVs, wherein each of the plurality of UAVs includes at least one container containing payload material and is configured to disperse the payload material at a designated dispersion area in an event site; the method comprising:

operating a computerized command and control unit for:

receiving from a data acquisition device situation awareness data from the event site;

transmitting the situation awareness data to a user device;

receiving user data input from the user device; the user data input including information of a selected payload dispersion area; the payload dispersion area including a plurality of segments each of which is assigned with a respective dispersion area;

processing the situation awareness data and/or the user data input to determine a required payload capacity for each of the plurality of segments, wherein the payload capacity of each given segment from the plurality of segments is determined based on situation awareness data characterizing the respective dispersion area of the given segment;

assign one or more UAVs from the plurality of UAVs to each of the plurality of segments, based on the required payload capacity; and generate for each of the plurality of UAVs a respective flight plan including a flight path for directing the UAV from an estimated dropping point location to a dispersion point;

wherein the assigning one or more UAVs from the plurality of UAVs to each of the plurality of segments comprises:

estimating based on the situation awareness data and/or the user data input, a total amount of payload required in each given segment of the plurality of segments; and determining a number of UAVs from the plurality of UAVs assigned to a given segment of the plurality of segments, based on an amount of payload carried by each of the plurality of UAV.

13. The method of claim 12, further comprising:
providing each of the plurality of UAVs a respective flight plan; and
at each UAV:
autonomously operating a flight control unit for directing flight according to a respective flight path to a respective dispersion point; and
dispersing the payload at the dispersion point.

14. The method of claim 12, further comprising updating respective flight paths according to an actual dropping location and transmit flight path updates to the plurality of UAVs, following dropping of the plurality of UAVs from the airborne carrier aircraft.

15. The method of claim 12, wherein following dropping of the plurality of UAVs from the airborne carrier aircraft, the method further comprising:
monitoring flight progress of at least one UAV of the plurality of UAVs; and
transmitting to the at least one UAV flight instructions for operating a flight control unit on-board the at least one UAV for directing the at least one UAV to proceed to a respective dispersion point, in case a deviation from the respective flight plan is detected.

16. A system for deploying a plurality of unmanned aerial vehicles (UAVs) by an airborne carrier aircraft for dispersing payload material being a fire extinguishing material, each of the plurality of UAVs including at least one container containing payload material and being configured to disperse the payload material at a designated dispersion area in a wildfire site, the system comprising:
a computerized command and control unit mountable on-board the airborne carrier aircraft and operatively connected to a data acquisition device, the command and control unit being configured to:
operate the data acquisition device for obtaining situation awareness data from the wildfire site;
transmit the situation awareness data to a user device and receive user data input from the user device, wherein the user input data includes information of a selected payload dispersion area, wherein the payload dispersion area includes a plurality of area segments each of which is assigned with a respective payload dispersion area;
process the situation awareness data and/or the user data input to:
determine, based on the situation awareness data and/or the user data input, a current fire intensity at each given area segment of the plurality of area segments;
estimate a total amount of payload required for reducing the current fire intensity at each given area segment of the plurality of area segments to a desired intensity; and
determine a number of the plurality of UAVs assigned to each given area segment of the plurality of area segments, based on an amount of payload carried by each of the plurality of UAVs;
determine a required payload capacity for each of the plurality of area segments; wherein payload capacity of each given area segment from the plurality of area segments is determined based on situation awareness data characterizing the respective payload dispersion area of the given area segment;
assign one or more UAVs from the plurality of UAVs to each of the plurality of area segments, based on the required payload capacity; and
generate for each of the plurality of UAVs a respective flight plan including a flight path for directing the UAV from an expected dropping point location to a dispersion point.

17. A method of deploying a cloud of unmanned aerial vehicles (UAVs) for dispersing thereby payload material, by an airborne carrier aircraft configured to carry and deploy a plurality of UAVs, wherein each of the plurality of UAVs includes at least one container containing payload material and is configured to disperse the payload material at a designated dispersion area in an event site; the method comprising:
operating a computerized command and control unit for:
receiving from a data acquisition device situation awareness data from the event site;
transmitting the situation awareness data to a user device;
receiving user data input from the user device; the user data input including information of a selected payload dispersion area; the dispersion area including a plurality of segments each of which is assigned with a respective dispersion area;
processing the situation awareness data and/or the user data input to determine a required payload capacity for each of the plurality of segments, wherein the payload capacity of each given segment from the plurality of segments is determined based on situation awareness data characterizing the respective dispersion area of the given segment;
assign one or more UAVs from the plurality of UAVs to each of the plurality of segments, based on the required payload capacity; and
generate for each of the plurality of UAVs a respective flight plan including a flight path for directing the UAV from an estimated dropping point location to a dispersion point;
wherein the event site includes a wild fire, and wherein assign one or more UAVs from the plurality of UAVs to each of the plurality of segments further comprises:
determining, based on the situation awareness data and/or the user data input, a current fire intensity at each given segment of the plurality of segments;
estimating a total amount of payload required for reducing the current fire intensity at each given segment of the plurality of segments to a desired intensity; and
determining a number of the plurality of UAVs assigned to each given segment of the plurality of segments, based on an amount of payload carried by each of the plurality of UAVs.

* * * * *